United States Patent
Dow et al.

(10) Patent No.: US 10,741,086 B2
(45) Date of Patent: Aug. 11, 2020

(54) METHOD AND SYSTEM FOR GENERATING AERIAL IMAGING FLIGHT PATH

(71) Applicant: D2, LLC, Birmingham, AL (US)

(72) Inventors: James W. Dow, Birmingham, AL (US); W. Scott Dow, Birmingham, AL (US)

(*) Notice: Subject to any disclaimer, the term of this patent is extended or adjusted under 35 U.S.C. 154(b) by 202 days.

(21) Appl. No.: 16/053,558

(22) Filed: Aug. 2, 2018

(65) Prior Publication Data

US 2019/0295423 A1    Sep. 26, 2019

Related U.S. Application Data

(60) Provisional application No. 62/648,094, filed on Mar. 26, 2018.

(51) Int. Cl.
*G08G 5/00* (2006.01)
*B64C 39/02* (2006.01)

(52) U.S. Cl.
CPC ......... *G08G 5/0034* (2013.01); *B64C 39/024* (2013.01); *G08G 5/0069* (2013.01); *B64C 2201/123* (2013.01); *B64C 2201/146* (2013.01)

(58) Field of Classification Search
CPC ........ B64C 2201/123; B64C 2201/127; B64C 2201/14; B64C 2201/146; B64C 39/024; B64D 43/00; B64D 47/08; G08G 5/003; G08G 5/0069
See application file for complete search history.

(56) References Cited

U.S. PATENT DOCUMENTS

| | | | |
|---|---|---|---|
| 5,867,804 A | 2/1999 | Pilley | |
| 7,447,593 B2* | 11/2008 | Estkowski | G05D 1/0212 701/301 |
| 10,424,105 B2* | 9/2019 | Summerville | G06T 15/205 |
| 10,618,673 B2* | 4/2020 | Chan | B64C 39/024 |
| 2010/0004798 A1 | 1/2010 | Bodin | |

(Continued)

FOREIGN PATENT DOCUMENTS

| CN | 10627896 A | 10/2016 |
|---|---|---|
| JP | 2014-185947 | 10/2014 |

OTHER PUBLICATIONS

Steffen et al., "On Visual Real Time Mapping for Unmanned Aerial Vehicles," The International Archives of the Photogrammetry, Remote Sensing and Spatial Information Sciences. vol. XXXVII, Part B3a. Beijing 2008, pp. 57-62 (6 pages).

(Continued)

*Primary Examiner* — Tyler J Lee
(74) *Attorney, Agent, or Firm* — Nixon Peabody LLP

(57) ABSTRACT

A method and system for developing a flight plan for taking images from an area of interest is disclosed. A series of trajectories is determined. Each trajectory is determined based on a logarithmic spiral curve derived from a range of predetermined basis angles and selecting a constant tangent angle between a radial line from the location of an image sensor to a target location, and a tangent line to the logarithmic spiral curve at the location of the image sensor. A set of trajectories from the series of trajectories is selected. The selected trajectories are scaled to cover the area of interest. The selected trajectories are transformed to coordinates corresponding to the area of interest. The set of scaled and transformed trajectories are stored as the flight plan for taking images of the area of interest.

29 Claims, 16 Drawing Sheets

(56) References Cited

U.S. PATENT DOCUMENTS

| | | | |
|---|---|---|---|
| 2014/0200744 A1* | 7/2014 | Molander | G05D 1/101 |
| | | | 701/2 |
| 2017/0039859 A1 | 2/2017 | Hu | |
| 2017/0138732 A1* | 5/2017 | Pettersson | G05D 1/0094 |
| 2017/0215086 A1 | 7/2017 | Priest | |
| 2017/0301109 A1 | 10/2017 | Chan | |
| 2018/0004207 A1 | 1/2018 | Michini | |
| 2018/0053336 A1 | 2/2018 | Summerville | |
| 2018/0120846 A1* | 5/2018 | Falk-Pettersen | G06F 3/033 |

OTHER PUBLICATIONS

Pham et al., "A Survey on Unmanned Aerial Vehicle Collision Avoidance Systems," Department of Computer Science, Stony Brook University, Stony Brook, NY, USA (10 pages).

FMT News, Free and Independent, "Falcon's attack strategy could inspire new drones—study," AFP—Dec. 5, 2017 (3 pages).

Ponda et al., "Trajectory Optimization for Target Localization Using Small Unmanned Aerial Vehicles," AIAA Guidance, Navigation, and Control Conference Aug. 10-13, 2009, Chicago, Illinois, American Institute of Aeronautics and Astronautics, pp. 1-25 (25 pages).

"Remote Sensing of Environment: vol. 183, Sep. 15, 2016, pp. 129-143," downloaded on Aug. 6, 2018 from https://www.sciencedirect.com/science/article/pii/S0034425716302206 (26 pages).

Wiley Online Library, "Mitigating systematic error in topographic models derived from UAV and ground-based image networks," downloaded on Aug. 6, 2018 from https://onlinelibrary.wiley.com/doi/full/10.1002/esp.3609 (16 pages).

Wiley Online Library, "Minimising systematic error surfaces in digital elevation models using oblique convergent imagery," downloaded from https://onlinelibrary.wiley.com/doi/abs/10.1111/j.1477-9730.2011.00623.x (2 pages).

OpenDroneMap, "Dome distortion on reduced size image calcs of large area #608," downloaded on Aug. 6, 2018 from https://github.com/OpenDroneMap/OpenDroneMap/issues/608 (5 pages).

Carbonneau et al., "Cost Effective Non-Metric Photogrammetry from Consumer-Grade sUAS: Implications for Direct Georeferencing of Structure from Motion Photogrammetry," pp. 1-54, (54 pages).

Carbonneau et al., "Cost-effective non-metric photogrammetry from consumer-grade sUAS: implications for direct georeferencing of structure from motion photogrammetry," pp. 1-14, (14 pages).

Elmer et al., "Analysis of Different Methods for 3D Reconstruction of Natural Surfaces from Parallel-Axes UAV Images," The Photogrammetric Record 30(151): 279-299 (Sep. 2015), DOI: 10/1111/phor.12115 (21 pages).

James et al., "Systematic vertical error in UAV-derived topographic models: Origins and solutions," Geophysical Research Abstracts, vol. 16, EGU2014-3120, 2014, EGU General Assembly 2014, (3 pages).

Zhou et al., "Systematic errors in UAS Mapping—Doming Effect," UNSW Australia: UAS4RS Conference 2016 @ University of Queensland, Brisbane QLD (13 pages).

* cited by examiner

METHOD AND SYSTEM FOR GENERATING AERIAL IMAGING FLIGHT PATH

PRIORITY CLAIM

The present application claims priority from U.S. Provisional Application No. 62/648,094, filed Mar. 26, 2018. The contents of that application are hereby incorporated by reference in their entirety.

TECHNICAL FIELD

The present disclosure relates generally to digital image data capture; and more specifically, it is directed toward determining camera placement paths derived from logarithmic spiral trajectories for capturing images.

BACKGROUND

Digital imaging has been a tool used in numerous fields. With recent developments in digital imaging technology, and more recently with the proliferation of aerial drones, digital imaging use is expanding rapidly. Image collection, specifically focused on structure from motion (SfM) processing techniques, is performed widely using platforms such as an aerial drone equipped with consumer grade digital cameras. An important aspect of the current state of Structure from Motion (SfM) image collection can be characterized in terms of the impact that camera placement trajectories have on the delivered results.

Current UAV data collection strategies for rotor-wing quad-copters, and particularly those for fixed-wing platforms are largely based on the tried and tested flight plan styles developed for traditional aerial photography (e.g., orthophotography which are built up from sequential overlapping stereo pairs). With traditional orthophotography, the image data is acquired using regular parallel linear patterns, with overlapping images taken along a flight line forming an "image strip." The parallel overlapping image strips used to survey areas form an "image block."

Based on current research literature: "High resolution digital elevation models are increasingly produced from photographs acquired with consumer cameras, both from the ground and from manned aircraft as well as unmanned aerial vehicles (UAVs). However, although such digital elevation models may achieve centrimetric detail, they can also display systematic broad-scale error that restricts their wider use. Such errors, which in typical UAV data are expressed as a vertical "doming" of the digital elevation model (DEM) surface, result from a combination of near-parallel imaging directions and inaccurate correction of radial lens distortion. Using simulations of multi-image networks with near-parallel viewing directions, enabling camera self-calibration as part of the bundle adjustment process inherently leads to erroneous radial distortion estimates and associated digital elevation model error. This effect is relevant whether a traditional photogrammetric or newer structure-from-motion (SfM) approach is used; but errors are expected to be more pronounced in SfM-based digital elevation models, for which the use of control and check point measurements are typically more limited."

Again, from current literature: "Specifically, a regular (often rectangular and evenly spaced) pattern of traditional linear, straight, parallel trajectories covering an area, corridor, or point of interest is used when capturing the necessary photographs. In particular, the traditional, regular, linear, parallel flight lines (used to collect UAV imagery in the recent times) contribute particularly to the well-established and studied systematic (doming) errors in the 3D point clouds derived from the SfM processing workflow—even when alternate flight lines are flown in opposing directions. Such flight paths for collecting images result in the production and propagation of systematic errors within the SfM workflow processes. These errors are termed the "dome" effect. This effect occurs even though emphasis has been placed on maintaining 60% to 90% axial (forward) overlap and 20% to 40% lateral (side-to-side) overlap for placement of images on-the-ground within the target area."

A generally accepted consensus among researchers is that "convergent image capture along gently curved trajectories (e.g., circles) clearly mitigates SfM surface deformation in self-calibrating multi-image blocks." However, such circular trajectories are neither efficient nor effective enough to cover every potential area or shape.

The traditional (straight-linear-parallel) trajectory scenario (a logical carryover from the longstanding traditional aerial photography industry) is generally applied for all types of SfM projects—for point and linear targets (landmark features), agricultural (rural and urban areas), and corridors (highways, pipelines, electric power transmission corridors, railroads, waterways, etc.). An exception to this heuristic holdover practice might relate to a) cityscape areas with tall buildings or b) isolated tall towers where circular trajectories might be used. Of course, emphasis is always placed on capturing all available data in the shortest possible time frame—leaving the SfM software/workflow with the bulk of the production (problem solving) effort, particularly in the instance of using either manned or unmanned aircraft to collect the photographs where duration of flight is a major concern.

FIGS. 1A-1E depict specific, recent traditional, straight, parallel flight line patterns for unmanned aerial vehicles (UAVs). The processed results from such obtained images suffer from doming effects/errors. FIG. 1A shows traditional, longer, straight, parallel UAV flight lines for collecting digital images (digital aerial photographs) over a vineyard for the purpose of constructing 3D rendered point cloud models of the scene along with the associated orthophotography and DEM using SfM processing techniques.

FIG. 1B shows traditional, longer, straight, parallel UAV flight lines for collecting digital images (digital aerial photographs) over a cultivated agricultural land for the purpose of constructing 3D rendered point cloud models of the scene along with the associated orthophotography and DEM using SfM processing techniques.

FIG. 1C shows traditional, longer, straight, parallel UAV flight lines for collecting digital images (digital aerial photographs) over developed rural and/or urban land areas for the purpose of constructing 3D rendered point cloud models of the scene along with the associated orthophotography and DEM using SfM processing techniques.

FIG. 1D shows traditional, longer, straight, parallel UAV flight lines for collecting digital images (digital aerial photographs) over populated urban land areas for the purpose of constructing 3D rendered point cloud models of the scene along with the associated orthophotography and DEM using SfM processing techniques.

FIG. 1E shows traditional, longer, straight, parallel UAV flight lines for collecting digital images (digital aerial photographs) over rural and/or urban corridors for the purpose of constructing 3D rendered point cloud models of the scene along with the associated orthophotography and DEM using SfM processing techniques.

Thus, current methods of deploying cameras (on the ground or in the air) for capturing digital imagery (overlapping digital photographs) for the construction of SfM 3D topographical models and associated orthophotography generally use more traditional, straight, linear, parallel trajectories as shown in FIGS. 1A-1E. It has been demonstrated repeatedly that such trajectories have a strong inherent tendency to introduce systematic error (doming effect) into the delivered SfM products—often rendering the delivered products less than optimally suited for the intended purpose.

Thus, there is a need for a method to produce trajectories for image gathering that avoids the doming deformation effect. There is a need for a system that allows the generation of flight paths to maximize efficient errorless gathering of images over areas and corridors.

SUMMARY

One disclosed example is a method of developing a path for taking images from a geographic area of interest. A series of trajectories is determined. Each trajectory is determined based on a logarithmic spiral curve derived from a predetermined range of basis angles and selecting a constant tangent angle between a radial line from the location of an image sensor to a target location, and a tangent line to the logarithmic spiral curve at the location of the image sensor. A set of trajectories is selected from the series of trajectories and the trajectories are scaled to cover the area of interest. The selected trajectories are transformed to coordinates corresponding to the geographic area of interest. The set of scaled trajectories are stored as the path for taking images.

Another example is a system to determine a path for taking images of an area of interest. The system includes a storage device storing coordinates of the area of interest. A trajectory module is coupled to the storage device. The trajectory module is operative to determine a series of trajectories. Each trajectory is determined based on a logarithmic spiral curve derived from a predetermined range of basis angles and selecting a constant tangent angle between a radial line from the location of an image sensor to a target location, and a tangent line to the logarithmic spiral curve at the location of the image sensor. The trajectory module stores the series of trajectories in the storage device. The trajectory module allows the selection of a set of trajectories from the series of trajectories and scales the selected set of trajectories to cover the area of interest. The trajectory module transforms the scaled selected set of trajectories to coordinates to cover the area of the interest. A display module is coupled to the trajectory module. The display module displays the selected set of trajectories over an image of the area of interest.

Another example is a system for imaging an area of interest. The system includes an image sensor operable to capture images and a flight controller having a flight plan. The flight plan is generated by determining a series of trajectories. Each trajectory is determined based on a logarithmic spiral curve derived from a predetermined range of basis angles and selecting a constant tangent angle between a radial line from the location of an image sensor to a target location, and a tangent line to the logarithmic spiral curve at the location of the image sensor. A set of trajectories is selected from the series of trajectories. The selected set of trajectories is scaled to cover the area of interest. The selected set of scaled trajectories is transformed to coordinates corresponding to the area of interest. A set of waypoints is generated for the flight plan. An aircraft having the image sensor and controlled by the flight controller in accordance to the flight plan flies over the area of interest collecting images.

The disclosed system allows the reuse of a previously constructed dense set of logarithmic-spiral template trajectories constructed on a unit scale basis. The dense set of template trajectories may re-scaled up or down to reflect a target area's true geometrical size and shape. The geometrically re-scaled set of template trajectories are transformed (translated and rotated) into a convenient Cartesian geographical coordinate system necessary to frame the trajectories in a target's real world location and orientation. A number of "favored" trajectories are selected (extracted) from the larger set of (scaled and transformed) template trajectories to provide favorable camera placement locations which are easier to access and occupy (fly) to obtain improved SfM results. Waypoints associated with the selected, favored trajectories are downloaded to commercially available mapping software and/or UAV mission planning and/or flight control software to fly the mission (trajectories) and collect the photographs or images for SfM processing.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 4A-4D are diagrams of logarithmic spiral trajectories using a full range of Theta (basis angle) values along with a representative number of Psi (constant tangent angle) values, while FIG. 4B-4D illustrate that the logarithmic spiral trajectories of FIG. 4A are successively rotated about the x-axis and mirrored relative to the y-axis direction;

Figure 1A:
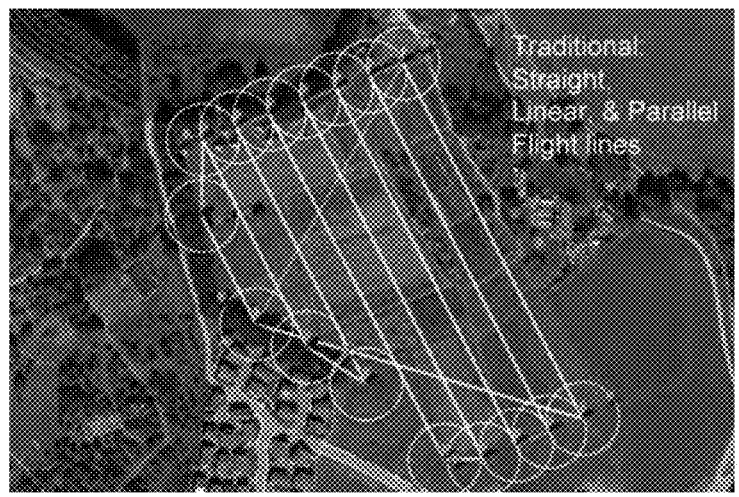
FIGS. 1A-1E are prior art linear flight patterns for imaging of different terrains that may result in doming errors.
Figure 1B:
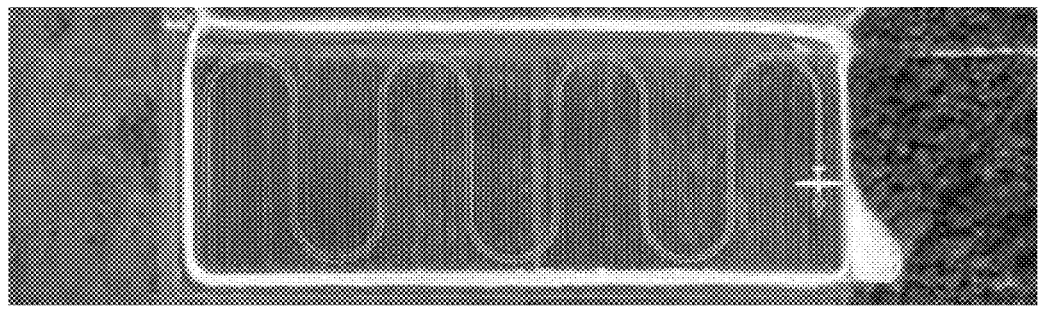
Figure 1C:
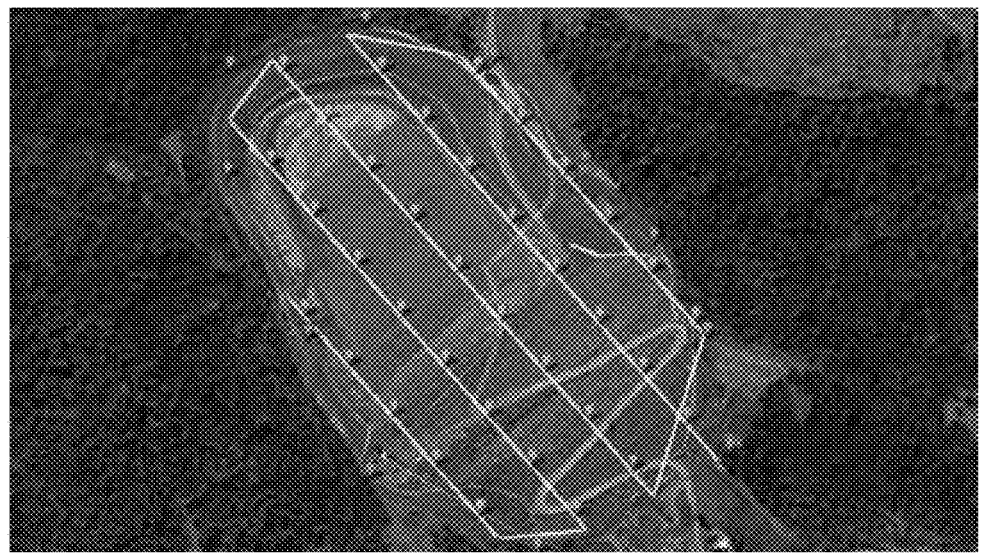
Figure 1D:
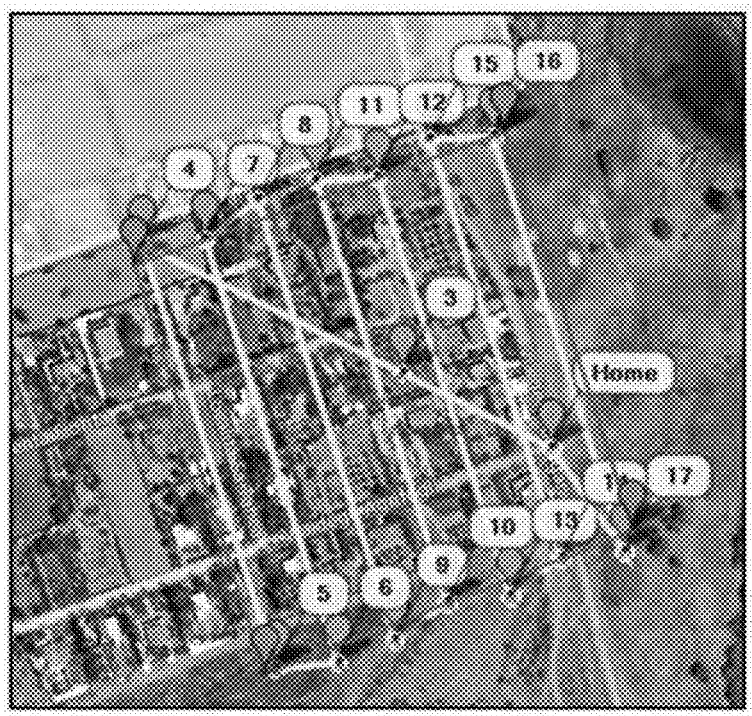
Figure 1E:
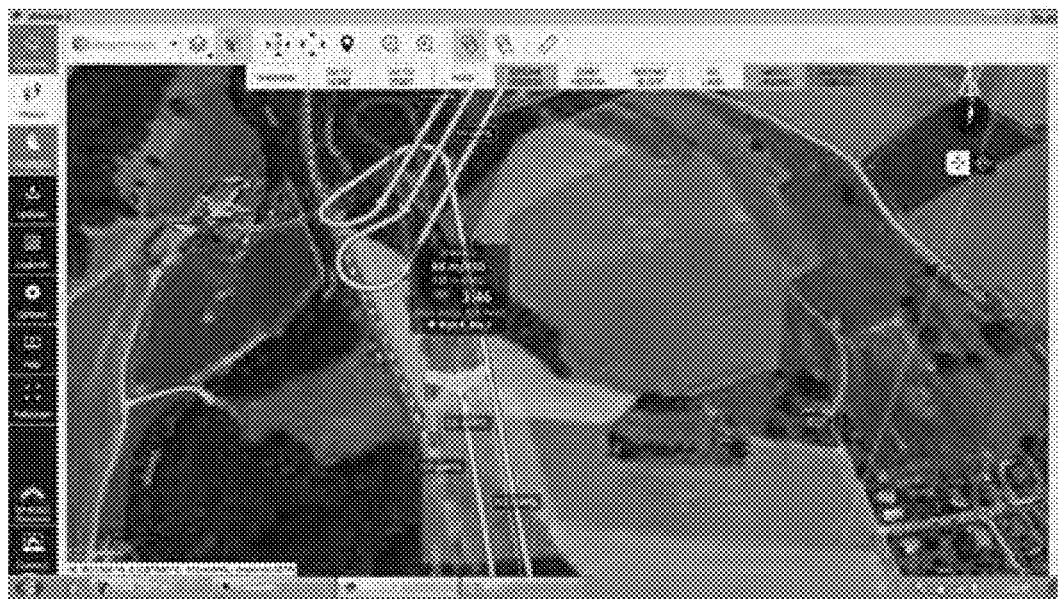

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a method and system for prescribing and constructing nontraditional camera placement trajectories (each a series of specific waypoints) to more effectively capture digital image networks for the production of geometrically and geographically correct 3D point cloud models using Structure-from-Motion (SfM) techniques. The specific waypoints along gently curving trajectories may guide photographers in the placement of cameras. The specific waypoints may also provide pathways for ground vehicles and/or flight lines for manned/unmanned aircraft and/or trajectories for water-borne craft carrying an adequate payload of vertical and/or oblique cameras of various types sufficient for the prescribed imaging of the point, area, or corridor of interest. The unique, gently curving, convergent, non-parallel, continuously changing shape (characteristics) of camera trajectories produced using the disclosed method and system are necessary and sufficient to significantly contribute to the resolution of identified systematic errors previously experienced in SfM production of 3D topographic models from digital photographs captured using traditional straight, linear, parallel camera trajectories.

The present disclosure, invoking a deliberately re-directed implementation of well-understood and observed natural phenomenon along with solid mathematical principles, embodies traits and properties which are consciously directed at countering the observed shortfalls encountered in the current and popular traditional digital image capture techniques supporting the SfM workflow—the mitigation of "doming" systematic errors. That is, the present disclosure exposes new method(s) for addressing the systemic doming problem prevalent in some (if not most) traditional SfM data modeling endeavors.

Figure 2A:
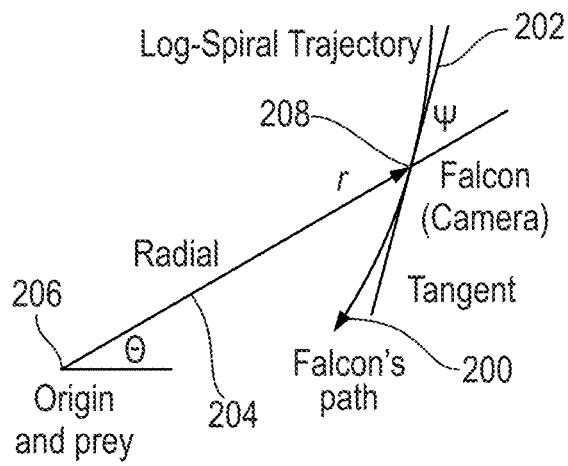
FIG. 2A is a diagram of the principle of using the natural flight trajectory of a bird of prey to provide a trajectory with a constant tangent angle focused on the target object.

Initially, the disclosed camera trajectories, which mimic spiral shapes observed in nature including the "attack" flight paths of large birds of prey (falcons and eagles), are constructed on a "unit" scale in the polar (r, Theta) coordinate system as modeled using the logarithmic spiral curve equation which follows, in which r is the position vector (from the curve's origin to the viewing point), Psi is the constant tangent angle relative to the curved path at position r, and Theta is the basis angle of the defining equation. Such a curve 200 is shown in FIG. 2A. FIG. 2A also illustrates a tangent line 202, a radial line 204 and an origin point 206. The origin point 206 represents the object or prey of interest. The angle between the radial line 204 and the horizontal of the origin point 206 (Theta) varies continually as the trajectory is traversed. The angle between the radial line 204 and the tangent line 202 (Psi) remains constant as the trajectory is traversed. The intersection of the radial line 202 and the tangent line 204 represents a current occupied point 208 of the trajectory, which is the current location of the camera (bird's eye).

FIG. 2A illustrates a very important characteristic, the constant tangent angle, of the logarithmic spiral trajectory that large birds of prey take advantage of. The constant tangent angle (Psi) is formed between the radial line 204 from the origin (prey) location to the camera location (falcon's eye) and the tangent line 202 to the logarithmic spiral curve 200 at the camera's current location (falcon's eye). This tangent angle remains constant along the entire length of the logarithmic spiral curve 200. Thus, with its head held stationary and directed straight ahead, the falcon's eye (camera) is constantly focused on the prey (origin) throughout the entire traverse of the logarithmic spiral curve (flight path). In the falcon's case, this characteristic is a direct result of the construction of the falcon's eye; but it is a characteristic that can be modeled (and taken advantage of) by camera operators on both the ground and in the air to reduce image modeling error when SfM processing techniques are employed. The errors are thus reduced by collecting additional convergent images taken at an oblique angle (constant tangent angle) to the trajectory of a primary (vertical/oblique) camera or cameras. The image modeling error is thus reduced even when an additional convergent (constant tangent angle) oblique camera is not used, since the orientation of the images taken by the primary camera or cameras is constantly changing as the primary camera(s) is moved along the prescribed trajectories.

Figure 2B:
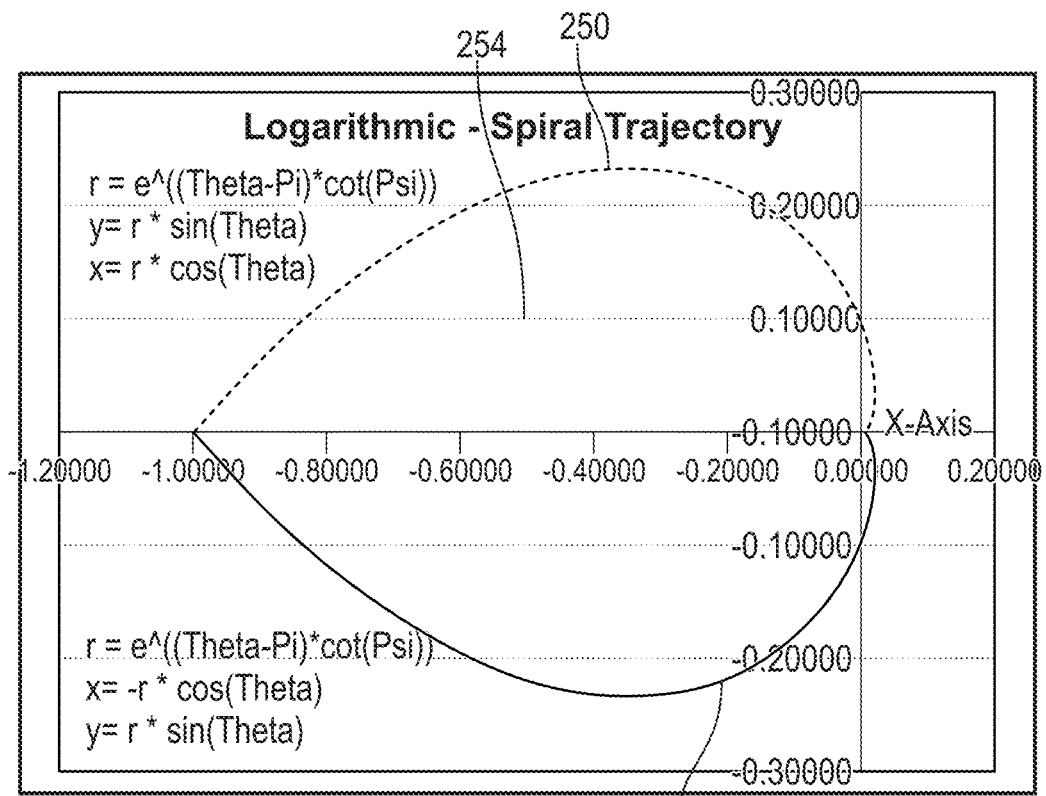
FIG. 2B is a graph of a logarithmic spiral curve rotated about the x-axis to offer a full convergent view of a target area using a single flight circuit.

FIG. 2B illustrates a logarithmic spiral curve 250 which can be found throughout nature. Described mathematically, the curve is of the general form shown in FIG. 2B. The logarithmic spiral curve is generated from the following equation:

$$r = +e\char`\^((\text{Theta} - \pi) * \cot(Psi)) \quad (1)$$

In this equation, r is the distance from the origin (target) to the logarithmic curve, Theta is the predetermined basis angle, and Psi is the constant tangent angle. In this general equation, the primary variables are constrained as follows: (0≤Theta≤2π) and (0≤Psi≤π) with π=3.1416 and e (Euler's constant)=2.71828. Alternatively, the logarithmic spiral curve may be approximated using Fibonacci sequence numbers as well as other formulations involving a mathematical series of numbers. For example, construction of the trajectories using logarithmic-spiral equations or alternative approximation techniques such as Fibonacci numbers, mathematical series, Bezier curves, or B-splines, or curve-fitting techniques may be used.

In the disclosed method, the general form of the logarithmic spiral equation is constrained in order to provide a more specialized and fundamental result. As (r=^((Theta−π)*cot(Psi)) produces results in polar coordinates (r, Theta), the polar coordinates are converted to two-dimensional Cartesian coordinates (x, y) for display in FIG. 2B by computing (x=+r*cos(Theta)) and (y=+r*sin(Theta)). An upper half curve 250 of FIG. 2B illustrates the exponential function with (0≤Theta≤π) and (Psi=(π/6)). The curve 250 is situated above the x-axis with a true unit scale (−1≤x≤+1), where (0≤Theta≤π) and (Psi=(π/6)). Thus, a value is assigned to Psi (the constant tangent angle); while Theta (basis angle) is cycled through its entire range of values to construct a particular logarithmic spiral curve. These computed results are shown by the curve 250. This procedure (with a different value of Psi) may be used to construct other logarithmic spiral curves. For practical applications (practical scaling purposes), the logarithmic curves are considered to exist in a range (−1≤x≤0) along the negative x-axis. However, the extension of the logarithmic curves beyond the y-axis (x>0) naturally facilitates a convenient transition from one trajectory such as the curve 250 to another trajectory based on a lower half curve 252 when the final flight plan is constructed.

The lower half curve 252 of FIG. 2B illustrates the rotation of the exponential function about the horizontal x-axis as (x=−r*cos(Theta)) and (y=+r*sin(Theta)). The upper and lower logarithmic spiral curves 250 and 252 of FIG. 2B are two separate trajectories intended to divide the region into two equal portions divided by the x-axis. When the two separate trajectories 250 and 252 are traversed in opposing directions, one after the other, a complete circuit (loop) of a central target (area of interest) 254 can be circumscribed. This circuit may be used in providing a flight plan.

Figure 3:
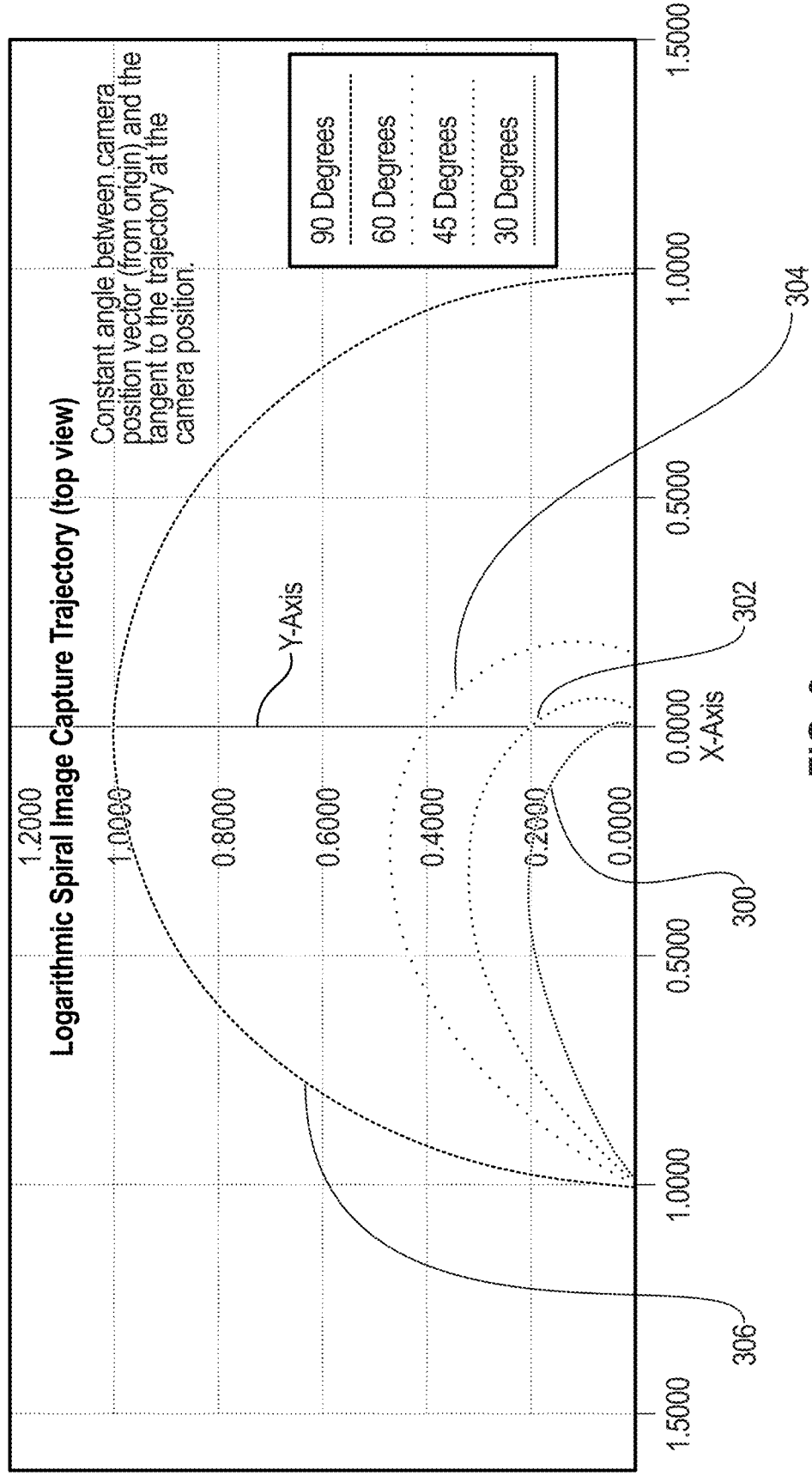
FIG. 3 is a graph of unit-scale logarithmic curves created as a basis for generating a set of unit-scale flight plan templates.

FIG. 3 shows constructed logarithmic spiral curves with a constant angle between the position vector and the tangent of the spiral trajectory, specified for each individual curve. FIG. 3 shows the general shape of the logarithmic spiral curve defined by the exponential function (r=^(Theta−π)*cot (Psi)) where (0≤Theta≤π), (Psi=30, 45, 60, and 90 degrees), and (π=3.1416) with (e=2.71828). For (Psi=90 degrees), the logarithmic spiral curve becomes a circle if Theta is allowed to vary between zero and 2π, which is a special case of the logarithmic spiral curve formulation. The constructed curves include a curve 300 at Psi=30 degrees, a curve 302 at Psi=45 degrees, a curve 304 at Psi=60 degrees and a curve 306 at Psi=90 degrees. The curves can be constructed for any value of Psi, varying Psi in equal or unequal incremental interval values. As the value of the constant tangent angle (Psi) is changed, the eccentricity of each resulting curve differs from that of the other curves, while the maximum distance between the curves is reasonably consistent and varies (increases with increasing values of Psi) at a reasonably consistent and predictable rate.

FIG. 3 depicts the "unit scale" of the chosen formulation of the logarithmic spiral curve. That is, for values of Psi less than or equal to 90 degrees, the logarithmic curves exist in a range on: a) the x-axis as [−1≤x≤+1]; and b) the y-axis as [−1≤y≤+1]. This unit scale of the logarithmic spiral curve is convenient. This means that the initially constructed curves are reusable. The initial unit scale curves can be re-scaled to represent (reflect) the geometrically correct size and shape of the intended target area. Additionally, the unit scale logarithmic spiral curves may be rotated about the x-axis and mirrored relative to the y-axis direction. The rotation and mirroring operations are performed regardless of the intended target area, whether the target area exists as a regular shape (e.g., point, triangle, square, circle, etc.), an irregular shape (e.g., rectangular, oval, odd-shape, etc.), or a long narrow segmented corridor area.

Figure 4A:
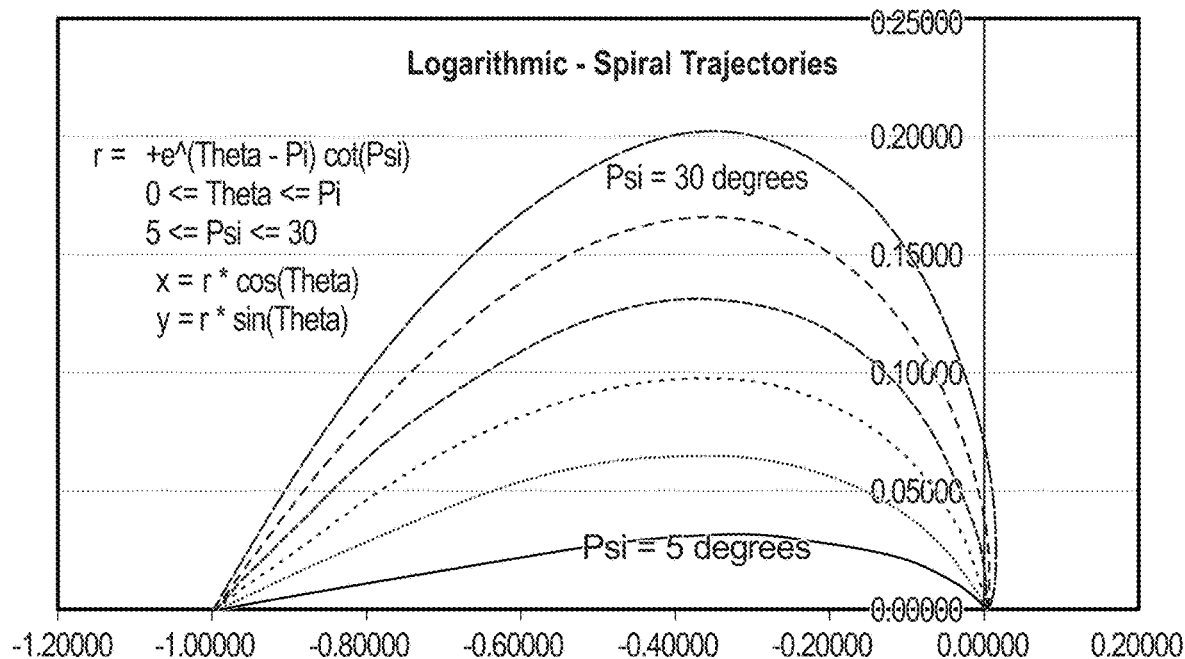

FIG. 4A illustrates a particular example family of logarithmic spiral trajectories with (0≤Theta≤π) and (Psi=π/36, π/18, π/12, π/9, π/7.2, and π/6). These chosen values of the Theta and Psi angles offer rather equally spaced set of trajectories (at their approximate midpoint or maximum y value). Additional values of Psi could be used to add more trajectories to those shown in FIG. 4A. The trajectories are non-linear, non-parallel, gently curving, convergent, and constantly changing direction throughout the entire trajectory. Additionally, the trajectories exist on a unit scale in both the x-axis and y-axis directions. At a value of Psi=30 degrees, the unit length ratio (Max X/Max Y) of the logarithmic spiral trajectories is approximately ((x/y)=(5/1)), which is an indication of the eccentricity of this particular trajectory. In FIG. 4A, the x-coordinates are computed as (x=+r*cos(Theta)); and the y coordinates are computed as (y=+r*sin(Theta)).

Figure 4B:
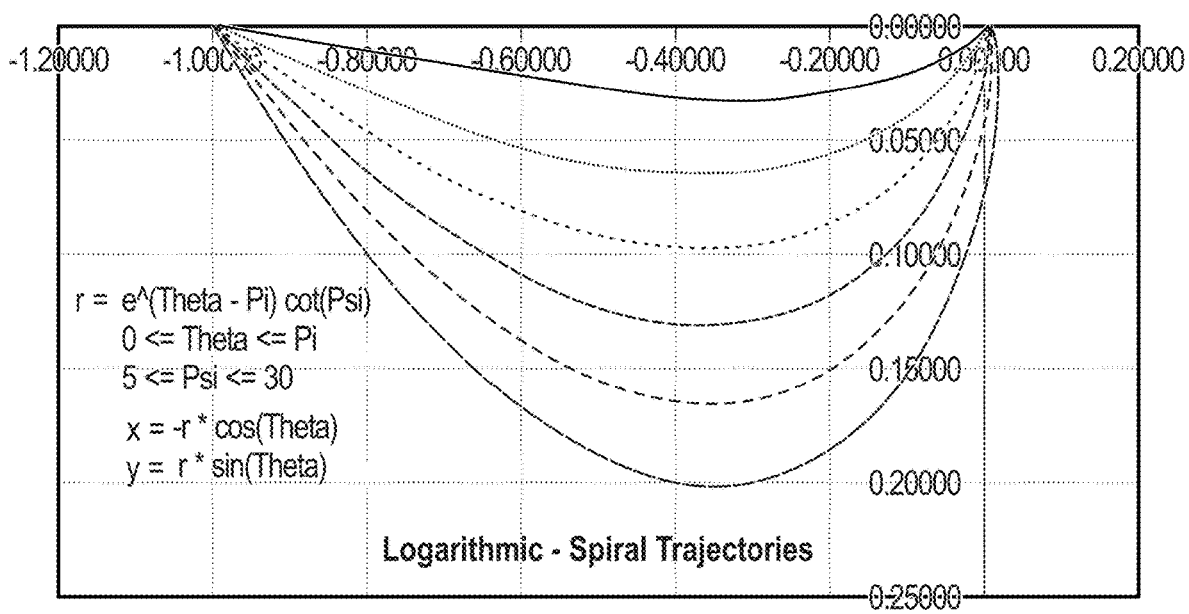

FIG. 4B presents the trajectories shown in FIG. 4A rotated about the horizontal x-axis. That is, the logarithmic spiral trajectories are first computed as (r=−e^((Theta−π)*cot(Psi)) with (0≤Theta≤π) and (Psi=π/36, π/18, π/12, π/9, π/7.2, and π/6); the x-coordinates are computed as (x=−r*cos(Theta)); and the y coordinates are computed as (y=+r*sin(Theta)). The trajectories of FIG. 4B provide the first complement to the trajectories of FIG. 4A.

Figure 4C:
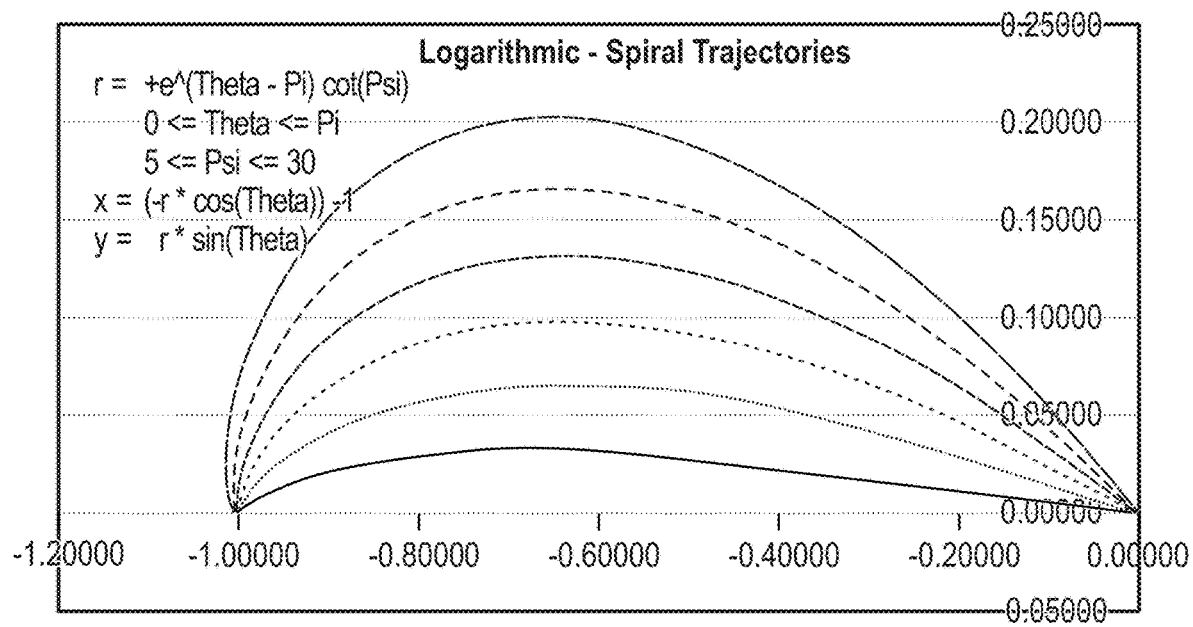

FIG. 4C shows a mirror image of the trajectories shown in FIG. 4A. FIG. 4C presents the trajectories shown in FIG. 4A mirrored with respect to the vertical y-axis. The logarithmic spiral trajectories in FIG. 4C are computed as (r≤+^((Theta−π)*cot(Psi)) with (0≤Theta≤π) and (Psi=π/36, π/18, π/12, π/9, π/7.2, and π/6); the x-coordinates are computed as (x=(−r*cos(Theta))−1); and the y coordinates are computed as (y=+r*sin(Theta)). The trajectories of FIG. 4C provide the second complement to the trajectories of FIG. 4A.

Figure 4D:
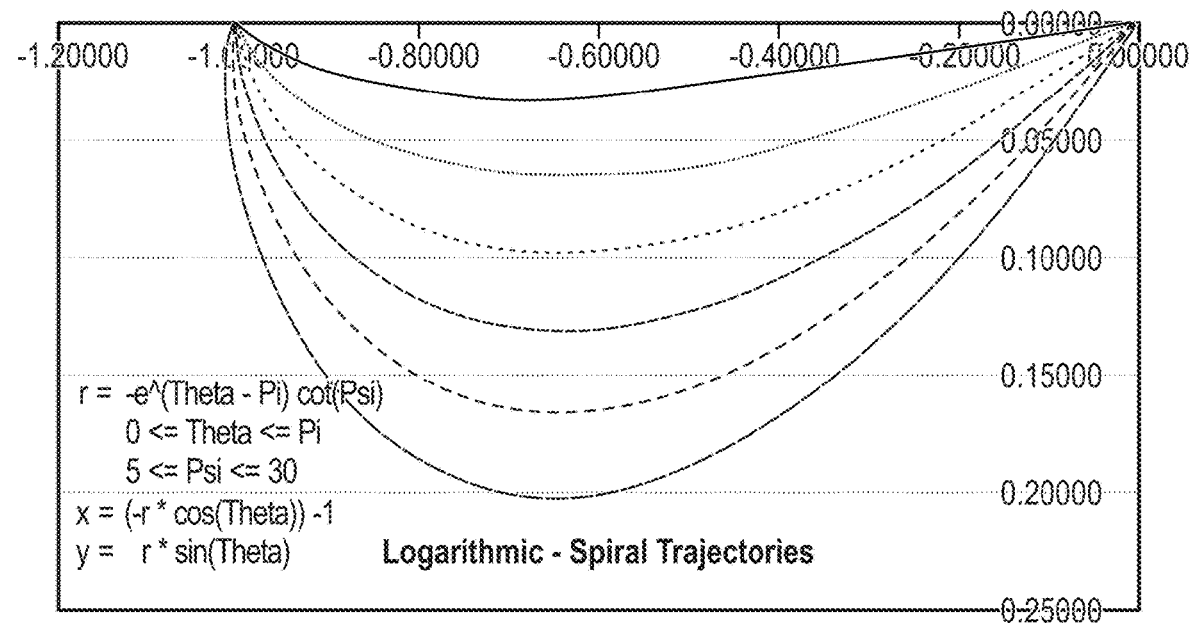

FIG. 4D shows the trajectories shown in FIG. 4A first mirrored (as shown in FIG. 4C) and then rotated about the horizontal x-axis. FIG. 4D presents the trajectories shown in FIG. 4C rotated about the horizontal x-axis. The logarithmic spiral trajectories in FIG. 4D are computed as (r=−e^((Theta−π)*cot(Psi))) with (0≤Theta≤π) and (Psi=π/36, π/18, π/12, π/9, π/7.2, and π/6); the x-coordinates are computed as (x=((+r*cos(Theta))−1); and the y coordinates are computed as (y=+r*sin(Theta)). The trajectories of FIG. 4D provide the third complement to the trajectories of FIG. 4A.

Once constructed, the unit-scale trajectories in FIG. 4A are rotated about the x-axis and mirrored with respect to the y-axis to become a set (family) of reusable trajectories. Next, a few trajectories can be selected (based on their suitability [eccentricity] to cover a target area of interest) to be re-scaled and transformed (translated and rotated) into a real-world Cartesian coordinate system. This provides optimal camera placement trajectories necessary and sufficient to support the collection of digital images (photographs) more suitable to be processed using SfM techniques. The example method and system of constructing trajectories for aerial/terrestrial collection of vertical and/or oblique digital photographs provides a unique diversity of view aspects for all types of targets. The technique affords a constant tangent (oblique) camera mounting angle for point and area type targets, thus avoiding the need to use gimbal-mounted cameras with their associated control issues. Also, the logarithmic spiral trajectory tempers the propensity of SfM techniques to produce results exhibiting the "dome" effect error. Thus, the method tempers the propensity for introducing the observed systematic error (doming effect) when the SfM workflow is subjected to digital imagery captured using traditional parallel and linear camera trajectories.

The process of determining a flight trajectory to reduce image modeling errors includes the following procedure. First, a dense set of reusable logarithmic-spiral trajectory templates is constructed on a unit scale basis. The dense set of trajectory templates is re-scaled (up or down) to reflect a true geometrical scale of the target area's size and shape. The geometrically re-scaled set of trajectory templates are transformed (translated and rotated) into the Cartesian geographical coordinate system necessary to frame the trajectories in the real world location and orientation of the target area. A number of "favored" trajectories are selected (extracted) from the larger set of (scaled and transformed) trajectory templates to provide favorable camera placement locations which are easy to access and occupy to obtain improved SfM results. Waypoints associated with the selected, favored trajectories are downloaded to commercially available mapping software and/or UAV mission planning software to fly the mission and collect the photographs for SfM processing.

The resulting favored trajectories may be selected by a camera operator based on the physical and operational characteristics of the chosen camera (image size on target), the axial/lateral image overlap requirements of the SfM software, the forward speed of movement of the deployment mechanism, and the camera(s) mounting angle. Other physical and operational characteristics (considerations) of the chosen camera may include the sensor array size, lens focal length, shutter speed, and image size at the chosen range to the target. The axial/lateral image overlap may include forward or side-to-side image overlap requirements of the SfM software for processing the collected images. The camera mounting angles are considered if the camera is moving along a selected trajectory. For the moving camera, the selected trajectories provide an inherent operational efficiency with one occupied trajectory practically aligning with the next (to-be-occupied) trajectory. This trajectory alignment characteristic provides a continuous path and thus saves transition time and energy for a camera platform such as a drone or a piloted vehicle.

Figure 5A:
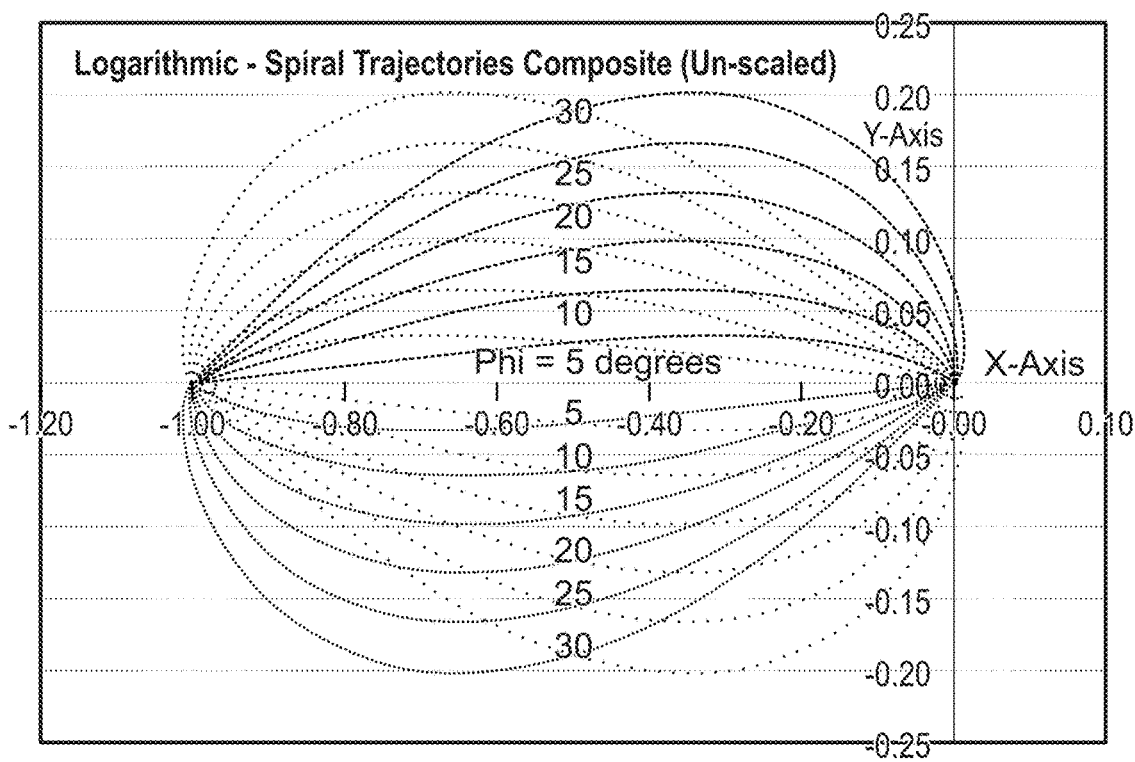
FIG. 5A is an unscaled (unit-scale) composite diagram of the available (derived rotated, and mirrored) logarithmic spiral trajectory templates from FIGS. 4A-4D.
Figure 5B:
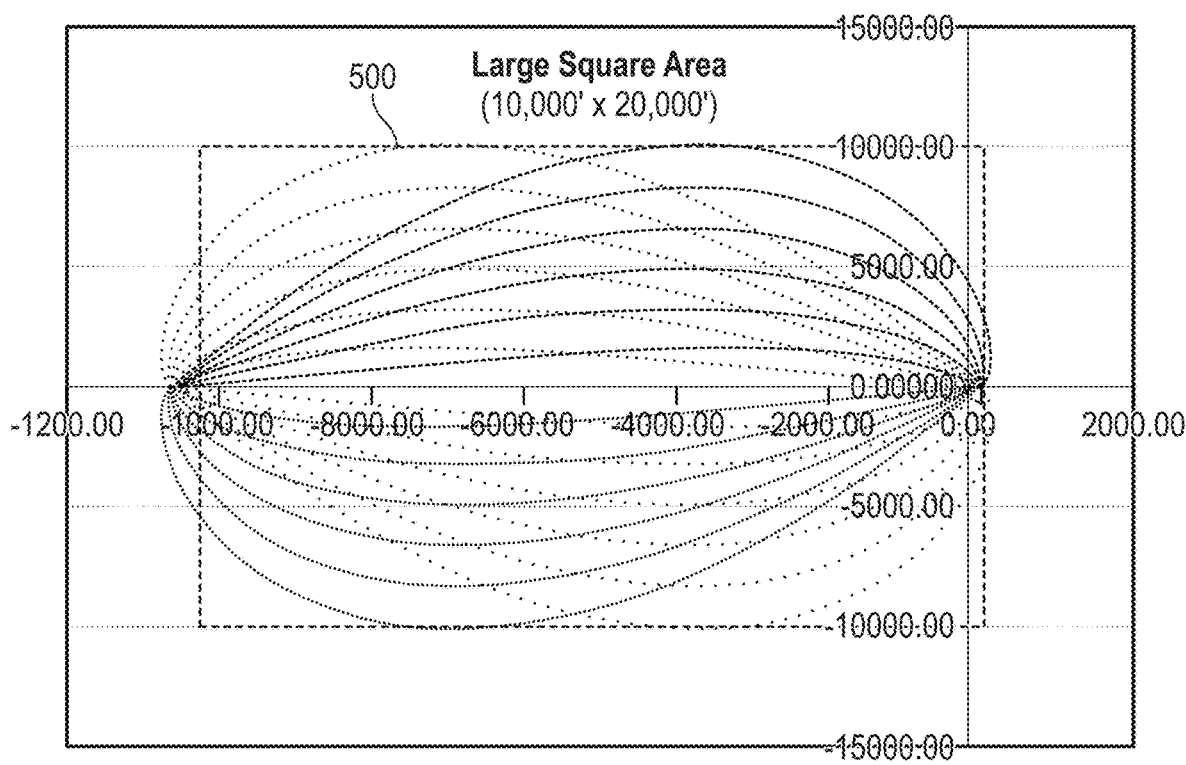
FIG. 5B is a composite diagram of the scaled logarithmic spiral trajectories from FIGS. 4A-4D covering a large square or rectangular area.
Figure 5C:
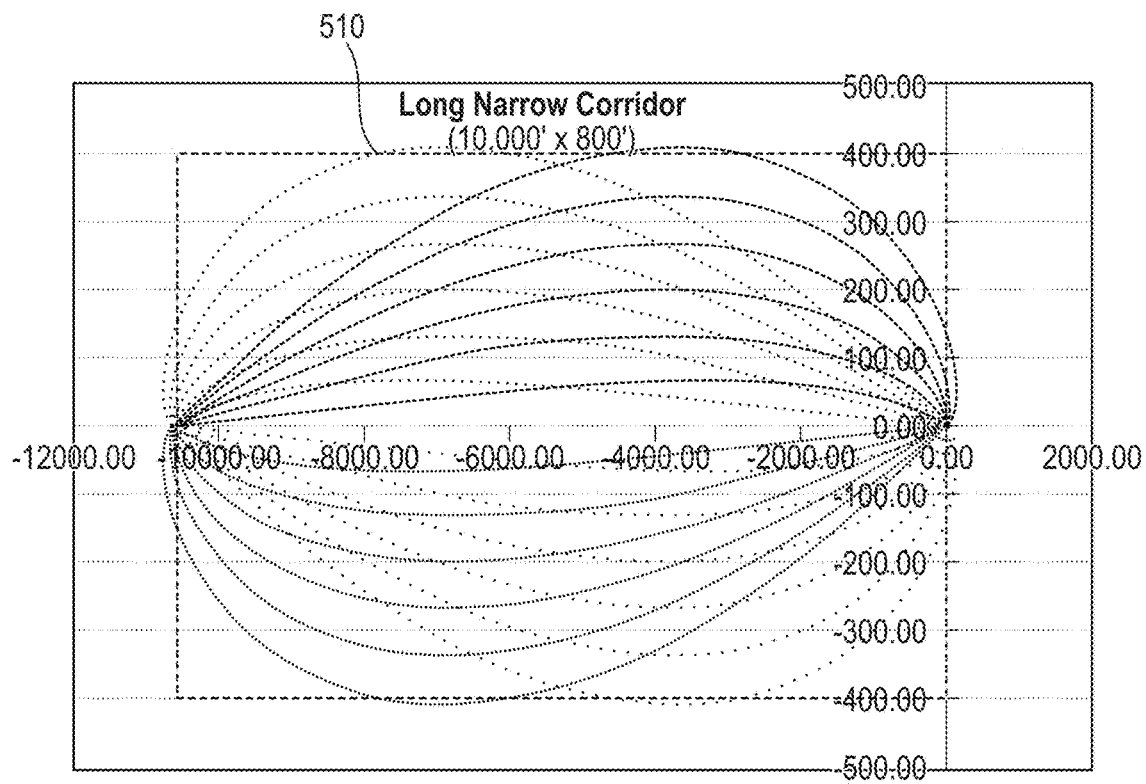
FIG. 5C is a composite diagram of the scaled logarithmic spiral trajectories from FIGS. 4A-4D for covering a long narrow corridor.

The above process, characteristics, and considerations may be seen in FIGS. 5A-5C. FIG. 5A shows all the trajectories in FIGS. 4A-4D as a composite set of trajectories covering a well-defined area and all exhibiting the characteristics of being gently curving, convergent with respect to the horizontal x-axis (target area), and continually changing direction throughout the covered area, while: a) maintaining a unit-scale along the horizontal x-axis and the vertical y-axis; b) offering a known constant tangent angle for each individual trajectory; and c) possessing the ability to be scaled (adjusted) appropriately (e.g., conform to the size and shape of the target area).

The trajectories in FIG. 5A exhibit the characteristics of being non-traditional (neither linear nor parallel, gently curving, convergent with respect to the x-axis, and constantly changing direction) in contrast to traditional (straight, linear, parallel) trajectories currently being used as aircraft flight trajectories for aerial photography. The composite set (family) of logarithmic spiral trajectories in FIG. 5A forms the basis from which to create practical camera trajectories suitable for photographing target areas of various sizes and shapes. The set of trajectories in FIG. 5A may be used as a comprehensive set of unit-scale logarithmic-spiral trajectory templates. This set of templates may be reused over and over as a basic set and the templates may be scaled to fit any target environment.

FIG. 5B shows the set of trajectory templates shown in FIG. 5A scaled to cover a large target area 500 of (10,000× 10,000) feet or meters for a square area or a large target area 500 of (10,000×20,000) feet or meters for a square area, depending on which trajectories are selected for either application. Of course, any preferred unit of measurement may be used for the scaling process. In this example, the scale factor in the x-direction is set to (X-Scale=10,625) while the scale factor in the y-direction is set to (Y-Scale=50, 000). As explained above in reference to FIG. 4A, the unit length ratio of the logarithmic spiral trajectory (Psi=30 degrees) is approximately ((x/y)=(5/1)), a convenient eccentricity for a regular (square or rectangular) target area.

Setting the scale factor in the x-direction to 10,625 extends the trajectories beyond the target length (10,000') by 625' to ensure ample coverage of the full length of the target area. The trajectory shapes on the left/right ends of FIG. 5B are maintained; and the more-exaggerated trajectories (larger values of Psi) do extend to the right (x>0) beyond the origin, facilitating transition from one trajectory to another.

The unit scale ratio of the logarithmic spiral trajectory (Psi=30 degrees) is approximately ((x/y)=(5/1)) as explained in reference to FIG. 4A, the y-scale factor is set (YScale= (10,000*5=50,000) to ensure coverage up to and including the y-extent (20,000') of an intended target area 500 in the central portion of the area. This setting (scale) leaves the extreme corners unexposed (uncovered). In order to cover the extreme corner areas, either the value of the y-scale factor may be increased, or additional template trajectories may be added using larger values of Psi in increments up to and including the value (Psi=π/2), which represents a circle trajectory. This scaling process may be effectively implemented using either a commercially available spreadsheet software product or it may be programmed via a custom software package.

FIG. 5C presents the set (family) of trajectory templates shown in FIG. 5A scaled to cover a target area 510 that is a long narrow corridor of (10,000×800) feet or meters. The intended target area 510 begins at the origin (0, 0) and terminates at about 10,000 feet in the "–x" direction. The trajectories are extended beyond the left intended end point (x=–10,000') by setting the x-scale factor to a value of 10,625 to illustrate a desire to ensure more-than-adequate coverage of the left end point. The trajectories naturally extend beyond the right (intended) end point of the target area (x>0) to illustrate an opportunity to take advantage of the fact that certain trajectories naturally extend beyond the origin such that the right end of the target area will be covered fully as a matter of course.

The scale factor in the y-direction is set to (YScale=10,000/5=2000) to ensure generous coverage of the central portion of an 800' wide corridor. Varying degrees of eccentricity are exhibited between the various trajectories. Again, a small portion of the extreme corner areas of the long narrow rectangular corridor will not be covered. However, in order to cover the corner areas, either the value of the y-scale factor may be increased or additional trajectories may be selected using larger values of Psi in increments up to an including the value (Psi=π/2), which represents a circle trajectory. FIGS. 5B and 5C taken together, illustrate the versatility and flexibility of the logarithmic spiral trajectory templates when using: a) the scaling operation; and b) the eccentricity characteristic (constant tangent angle) to cover two very different target areas/shapes.

Figure 6:
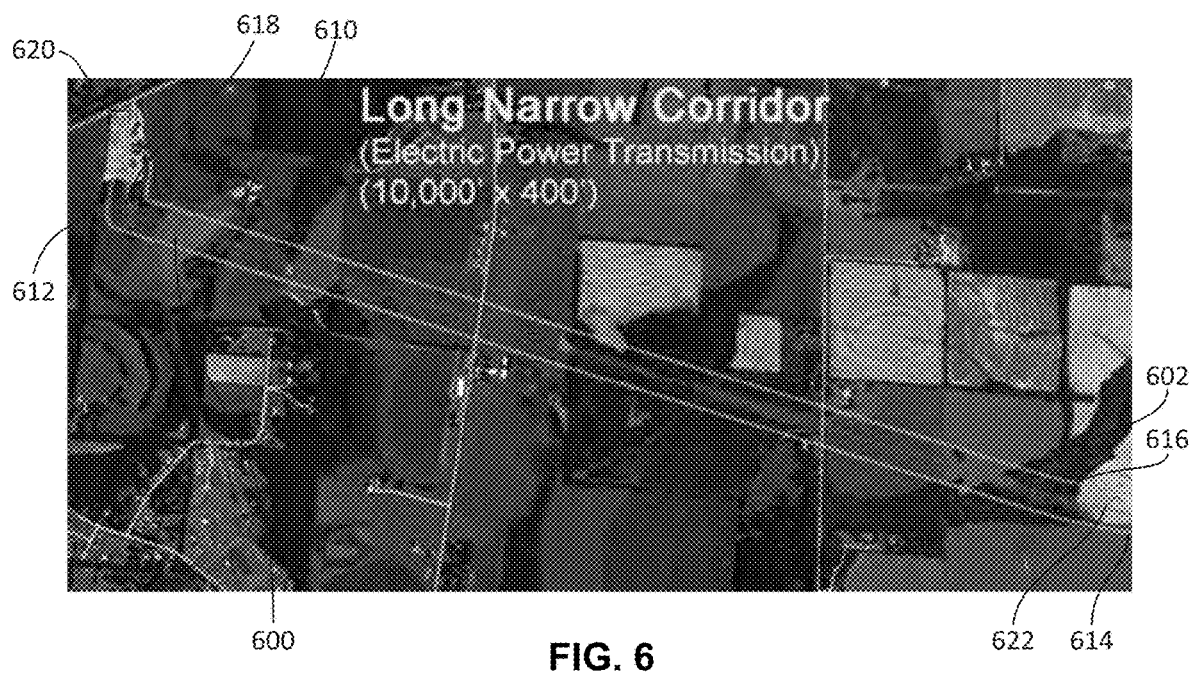
FIG. 6 is an image of an area of interest that is a long narrow corridor.

FIG. 6 shows an example of a bounded long narrow corridor shown in a photographic image 600 or an area of interest. The image 600 contains a long narrow, legally surveyed/bounded corridor 300' wide, which is an existing electric power transmission right-of-way located in southeastern Alabama, as displayed in Google Earth. Typically for aerial photography purposes, the corridor of interest would be 100' wider (50' wider on each side of the centerline) than the legal corridor. As such, the image 600 is geographically correct referencing WGS84 (Latitude/Longitude) coordinates. The actual corridor of interest (as evidenced by a centerline 602) is shown bounded by a buffer zone 610. Thus, the corridor to be photographed, in this example, is approximately 10,000' long and 400' wide and includes a left end 612 and a right end 614. The target segment is bounded by (in between) two turn points, a structure location 616 on the right end and a structure location 618 on the left end. Additional corridor lengths (segments) are shown on each end 612 (left) and 614 (right) of the target corridor segment of interest 610 for reference and orientation purposes. The transmission corridor itself terminates into an electric power transmission substation 620 shown in the upper left of the figure and it terminates into what will become a next corridor segment of interest 622 shown in the lower right portion of the image 600.

Long narrow corridors of this type are constructed in longer straight-line segments. For imaging purposes, each segment would be flown geographically in sequential order. For example, in this case, each corridor segment may be flown from left to right (west to east) one segment after another. In this example, the target segment terminates at transmission tower locations known as "points of intersection" or corridor turn points such as the structures at the turn points 616 and 618. As such, the photographic images collected over the target corridor segment of interest should include these two structures or transmission towers.

In order to overlay the previously constructed logarithmic spiral trajectories (Cartesian coordinates) onto the geographic area of the long narrow corridor FIG. 6, the geographic coordinates (Latitude/Longitude) used to depict the corridor in FIG. 6 first must be converted into a suitable Cartesian coordinate system (the Alabama-East State Plane Coordinate System in this example) using appropriate units of measure (US Survey FEET). For example, this conversion can be accomplished using a commercial software package such as Global Mapper and exported as a .shp (shape) file for display purposes.

Figure 7A:
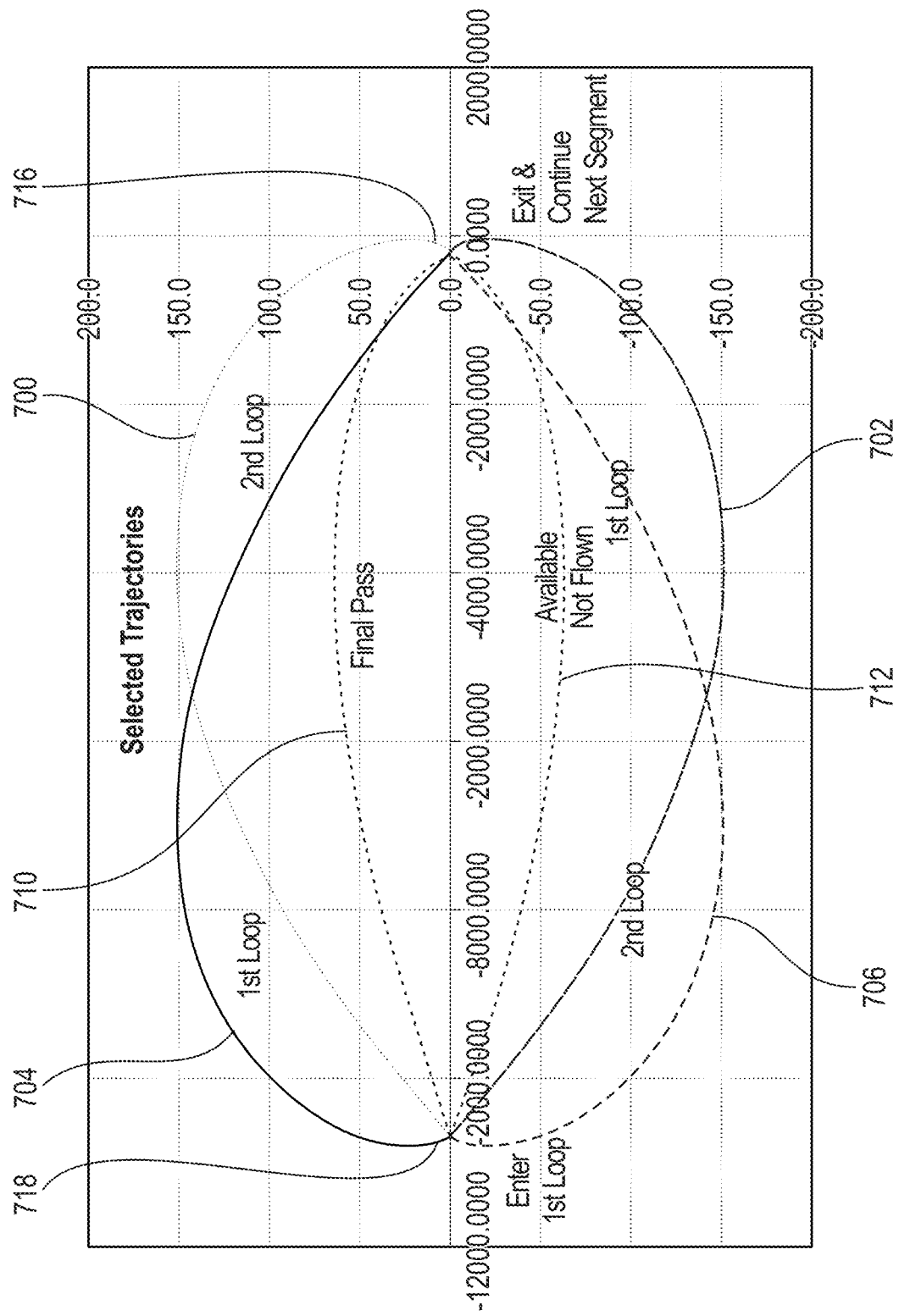
FIG. 7A shows selected scaled trajectories linked to form the basis for a flight plan covering a long narrow corridor.

FIG. 7A shows a few specific (sample) trajectories similar to the set of trajectories shown in FIG. 5C. However, these trajectories have been specifically constructed and scaled to cover a more precise area of interest (10,000'×300'), the legal transmission corridor, and, more importantly, to illustrate the efficiencies gained when different complementary trajectories, with the same eccentricity (Psi values), are linked to facilitate transitioning from one trajectory to another forming a single circuit (loop) circumscribing a given target area. The trajectories of FIG. 7A exist in a Cartesian coordinate system to facilitate simple mathematical operations such as scaling. The trajectories include a trajectory 700, a trajectory 702, a trajectory 704, a trajectory 706, a trajectory 710, and a trajectory 712. Four of these trajectories (700, 702, 704, and 706) are derived from the Psi value being 34 degrees. The two other trajectories (710 and 712) are derived from Psi being 19 degrees. The eccentricity of trajectories with Psi values of 34 degrees and 19 degrees are deemed sufficient to satisfactorily cover the legal corridor area (size and shape) of interest in this example. In this example the trajectory 712 is not initially intended as an active flight path, but it is available should it be needed to ensure complete coverage of the central target area. The five (5) trajectories 700, 702, 704, 706, and 710 were chosen, in part, because they cover an area of (10,000'×300'), matching the size and shape of the legal corridor of interest (between the structures at turn points 616 and 618) in the area of interest 600 shown in FIG. 6 and these five trajectories can be used to traverse (loop around, starting on a left end point 718) the entire length of the corridor of interest twice (transitioning between two trajectories per loop) while leaving the fifth trajectory 710 to reach (moving left to right) a "next" segment of interest point 716. A first loop is formed by: a) entering trajectory 700 from the left end point 718; b) traversing trajectory 700 left-to-right' c) smoothly transitioning onto trajectory 706 at the right end point 716; and d) traversing trajectory 706 right-to-left to the left end point 718. A second loop is formed using trajectories 702 and 704 by: a) smoothly transitioning (at the left end point 718) onto the trajectory 704 from the trajectory 706 of the first loop while moving right-to-left; b) traversing trajectory 704 left to right; c) smoothly transitioning to the trajectory 702 at the right end point 716; and d) traversing trajectory 702 right-to-left until the left end point 718 is reached. These particular trajectories are selected because, if an aircraft were to enter onto the first loop (at the left end point 718) created from the first trajectory 700 above the x-axis and follow it to the right end (origin), the aircraft would transition smoothly onto the second trajectory 706 of the first loop, below the x-axis, and follow it back to the left end or beginning point 718. Moving directly across the left end point 718 from the trajectory 706 onto the trajectory 704 (above the x-axis), the aircraft would transition smoothly from the first loop onto the second loop and proceed to the right end (origin) point 716 and proceed to smoothly transition onto the trajectory 702 of the second loop (below the x-axis) and continue back toward the left end (x=−10,000') and the beginning point 718. At the completion of the two loops, the aircraft has made two complete circuits around and through the area of interest. Ultimately, it is desirable to move along the long narrow corridor from left to right in order to move onto and survey a second segment of the corridor of interest, a "next" segment to the right beginning at the end point 716, as shown in FIG. 7A. As such, the aircraft makes a smooth and efficient counterclockwise turn, upon reaching the left end point 718 of the second loop, to occupy the "final pass" trajectory 710 traveling left-to-right in order to occupy and survey the "next" segment of the long narrow corridor extending to the right beyond the bounds of FIG. 7A. The next segment will have its own set of selected trajectories depending on its size (length and width) and shape.

Figure 7B:
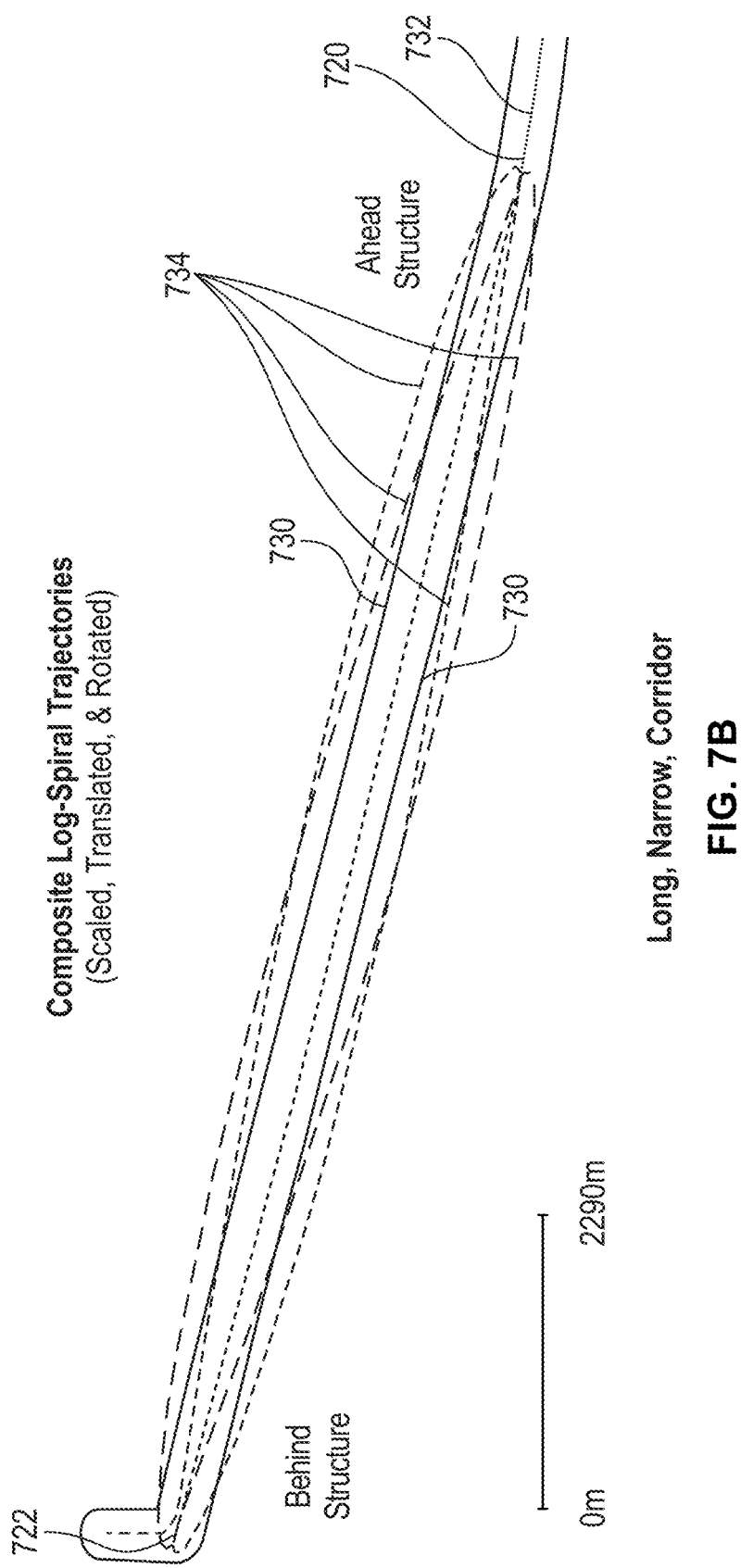
FIG. 7B shows the selected trajectories from FIG. 5C after being translated and rotated into their true geographic location and orientation and after being linked to form complete flight paths.

FIG. 7B depicts selected scaled trajectories from FIG. 5C after each trajectory has been transformed (mathematically) into a real-world Cartesian coordinate system. Each scaled trajectory has been translated to a geographic origin at a point 720. In this example, a turn point origin 720 represents an "Ahead" structure location at coordinates (Easting=826763.8' and Northing=270196.8'); and each trajectory has been rotated (clockwise) about the vertical z-axis of the origin. A left turn point 722 represents a "Behind" structure. Thus, the waypoints of each trajectory are scaled and transformed into the real-world Alabama-East State Plane (Cartesian) Coordinate System (NAD83/NAVD88) with horizontal units of measure being US Survey Feet and vertical units of measure being International Feet. The mathematics of the trajectory transformation process are well known and include, in vector form, a method for quickly determining the direction cosines required to perform the rotation step of the transformation process. Additionally, the selected, scaled, and transformed complementary trajectories have been linked to form flight loops (similar to the approach illustrated in FIG. 6) sufficient for efficiently covering the area of interest.

The trajectories are placed on-the-ground taking into account the base elevation (z=270.8' above sea level) of the Ahead structure 720 and the base elevation of the Behind structure 722. The elevation of the trajectories is important because any aerial photography operations (digital image collection) will need to be performed along the selected trajectories at a specific height-above-ground sufficient to maintain a required image footprint size on the ground. The required image footprint size is the size necessary and sufficient to produce an accurate resultant resolution and overlap, leading to an accurate SfM DEM model.

FIG. 7B depicts the scaled and transformed trajectories (the foreground) as an overlay onto physical boundaries 730 of a narrow transmission corridor (the background). The corridor's physical boundaries 730 isolate the area of interest (imaging target area) in this example. More explicitly, the entire area within the physical boundaries 730 and between the Ahead structure at point 720 and the Behind structure at point 722 constitutes the imaging target area. As shown in FIG. 7B, this imaging target area is completely covered by the selected trajectories. In order to produce the image in FIG. 7B, a centerline 732, the physical boundaries 730, and transformed trajectories 734 were imported into a commercially available software package (Global Mapper) in the form of Cartesian coordinates (Alabama-East State Plane Coordinates, NAD83/NAVD88 with horizontal units of US Survey FEET and vertical units of International Feet).).

After the transformation of the trajectory waypoints from a local Cartesian [x, y] system to a real world Cartesian [X, Y, Z] coordinate system, such as the Alabama-East State Plane Coordinate System, a readily available commercial mapping software package, such as Global Mapper, can be used to input the trajectories and export a kmz or kml file (world coordinates [Latitude/Longitude, elevation]) so that the trajectories and/or waypoints may be displayed using display software such as Google Earth for visualization and quality assurance purposes. Similarly, waypoints of the selected trajectories in the form of the kml file can be loaded into available commercial mission planning software, such as ForeFlight, for a manned aircraft mission plan. Waypoints may also be in the form of a .csv file that may loaded into available commercial mission planning software such as DJIFlightPlanner or Litchi Mission Hub for UAV aircraft/drones.

Figure 7C:
FIG. 7C is an image of a long narrow corridor with the selected trajectories in FIG. 7B projected on the corridor.

FIG. 7C shows an image of the area 600 in FIG. 6 with the set of selected trajectories 734 in FIG. 7B, displayed using Google Earth, plotted over the long narrow corridor of interest and covering the existing electric power transmission right-of-way. This is the quality assurance check. The selected trajectories 734 are now in a form that is geometrically and geographically correct. The selected trajectories 734 may be traversed, in the order prescribed in FIG. 7B, to photograph the corridor of interest by moving any of several cameras (mounted vertically and/or obliquely to the deployment mechanism) along the selected trajectory loops (waypoint to waypoint).

Traversing the trajectory loop(s) in the manner prescribed in FIG. 7B, camera(s) mounted obliquely to the body axis of the deployment mechanism should be pointed toward the right (convergent) side of the occupied trajectories when movement is in a clockwise direction to capture digital images in a most effective manner. Other camera(s) could be pointed either: a) vertically (nadir), b) obliquely forward or aft in the vertical plane along the direction of movement [tangent to the occupied trajectory] to capture images in a more sweeping movement pattern; and/or c) oblique relative to the horizon and in the direction of the constant tangent angle (Psi) to remain focused in the direction of the end point of the trajectory while capturing a larger overview of the entire scene. However, even if oblique cameras are not used, the images captured by vertical (nadir) cameras moving along the logarithmic spiral trajectories will exhibit a diversity of views not possible when traditional (linear and parallel) flight paths are used.

The complementary logarithmic spiral trajectories (constructed using a rotation about the x-axis with a mirroring along the y-axis direction) do cross each other in the central portion of the area of interest providing a unique diversity of view aspects for cameras mounted in both the vertical (nadir) and oblique orientations. The logarithmic spiral trajectories are constantly changing direction over the entire length of the trajectory. The resulting overlapping images with diverse view perspectives (constantly changing image orientations, one image relative to another) positively impact the results obtained from the SfM process. Thus, systemic error will not persist from single images through full (entire) image blocks as processed using a SfM workflow. The error from any single image will not be compounded (carried over) from one image to another through full image blocks.

Figure 7D:
FIG. 7D is a close up view of the selected trajectories in FIG. 7C showing waypoints along the flight paths (loops)

FIG. 7D shows a "zoom" view of the selected trajectories in FIG. 7C to illustrate (visualize in real world coordinates) unique characteristics of the example logarithmic spiral trajectories. These characteristics include the constantly changing directions of the trajectories. These changes include, gently curving (non-linear), convergent, (non-parallel, yet consistently focused), and differential eccentricity while being versatile and flexible in their application and use. These characteristics provide the SfM workflow with many digital overlapping images that are slightly and smoothly (incrementally) rotated and translated relative to each other while maintaining the required forward and lateral (side-to-side) overlap. At no point along the corridor stationing (axial distance along the corridor centerline) are the trajectories straight or parallel to one another.

FIG. 7D shows waypoints 740 that are unevenly distributed throughout the trajectory 734. The distribution is less densely spaced when less eccentricity is evident and more tightly spaced when more eccentricity is evident. In this example, the waypoints 740 are shown as black dots along one of the trajectories 734 for purposes of illustration. The waypoints 740 serve as navigation aids/points for moving along the trajectories either on the ground such as via a mobile ground vehicle or through the air via a manned or unmanned aircraft. Such vehicles may be guided by either manual or automated piloting techniques.

The method described above offers a tool for consistently collecting oblique overview images along the logarithmic spiral trajectories. That tool is the constant tangent angle Psi shown in FIG. 2A. Taking advantage of the constant tangent angle requires only that (while moving forward) the camera operator maintain the constant tangent angle between: a) the body axis of the mobile camera platform; and b) the line-of-sight to the target from the operator's perspective. Maintaining this constant tangent angle as the mobile camera platform moves forward ensures that the mobile camera platform is navigating along a logarithmic spiral trajectory. An example for implementation of this approach would be to use a modern GPS device or "pilot/operator" navigation device to: a) record a waypoint in the device at the target point location (e.g., end of the collective trajectories), b) maneuver the mobile camera platform to establish the constant tangent angle as the observed angle (difference) between the mobile camera platform's body axis heading and the device-determined heading to the target waypoint, while c) maneuvering the mobile camera platform forward in a manner that maintains that constant difference angle between the mobile platform's body axis heading and the device-determined heading to the target location. In fact, this approach could even be implemented visually/manually by mounting a physical "sighting" mechanism (any type of physical marker attached to the body of the mobile camera platform and offset from the body axis at the desired constant tangent angle) for the camera operator's use to maintain alignment of the "sight" and the target (e.g., line of sight).

The moving platform (camera) operator will ensure that the proper height-above-ground is prescribed and maintained throughout the image collection operation to acquire images with the appropriate amount of forward and side-to-side overlap. Also, the moving platform (camera) operator will ensure that an appropriate forward speed is prescribed and maintained to ensure that the images captured are not blurred. The camera's prescribed height-above-ground and forward speed will be maintained as the camera is traversed along any particular logarithmic spiral trajectory.

The desired flight plan includes a set of selected, scaled, and transformed logarithmic spiral trajectory waypoints. The flight plan may be used as an input to mission planning software and systems. Such mission planning software and systems may be used for either unmanned aircraft such as UAVs or in the form of pilot navigation software and systems for manned aircraft. In addition, such techniques may be used for ground or water based vehicles. For example, a plan may be prepared for an automated or robotic autopilot system for unmanned or manned ground or water based vehicles. Such systems may be specifically dedicated for navigation and guidance. Alternatively, more generic systems such as GPS mapping devices or GIS mapping devices may be used. Alternatively, generic computing devices such as tablets or smart phones may execute GPS or GIS mapping software incorporating the above mentioned path determination techniques.

Figure 8:
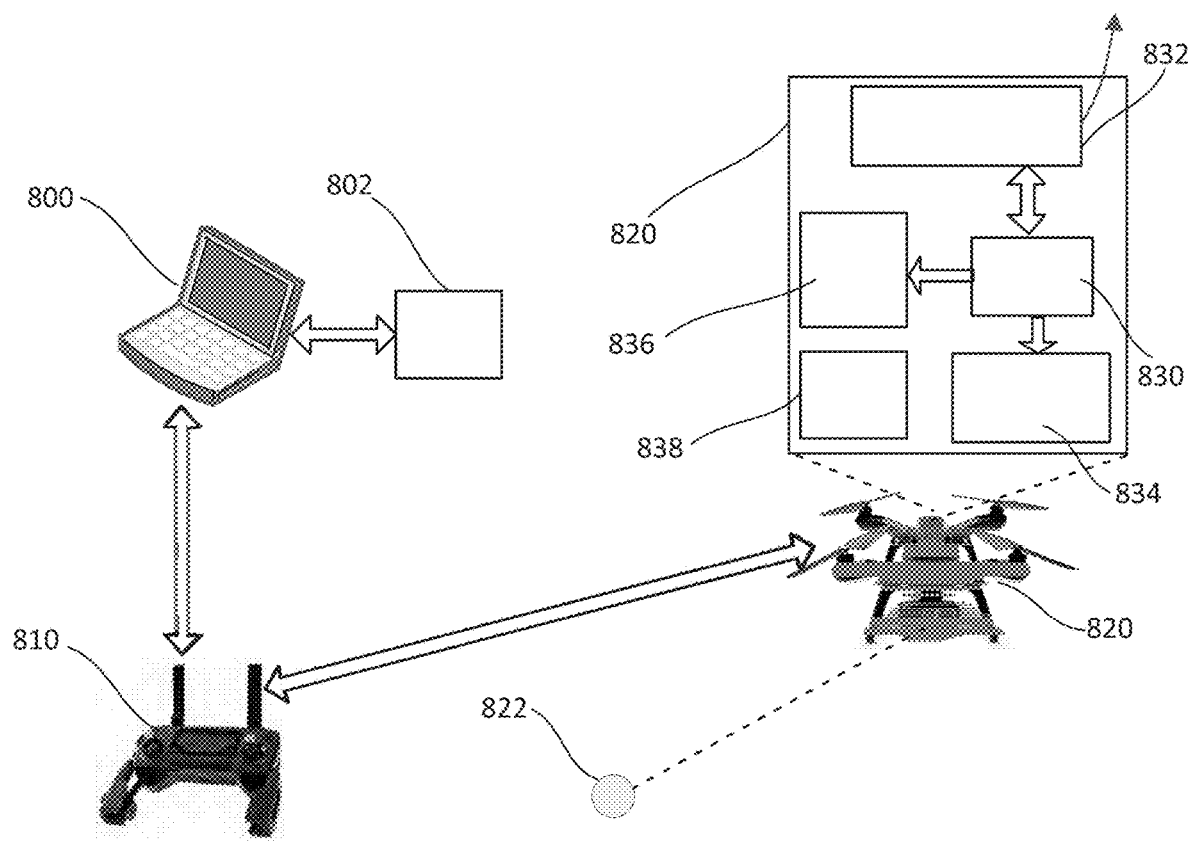
FIG. 8 is a diagram of an example drone/UAV aerial imaging system that incorporates the generated flight patterns.

FIG. 8 is a diagram of an example UAV aerial imaging system that may be used to determine logarithmic trajectories and implement a flight plan to image an area of interest. The system allows the determination and execution of a flight path. The system includes a computing device 800 that determines an appropriate flight pattern over an area of interest as explained above with reference to FIGS. 2A-7D.

The computing device 800 includes a storage device storing coordinates of the area of interest. The computing device executes a specialized trajectory module 802 that produces the data for the appropriate flight plan over an area of interest. The trajectory module 802 allows the determination of a series of trajectories. Each trajectory is determined based on a logarithmic spiral curve derived from a predetermined range of basis angles and selecting a constant tangent angle between a radial line from the location of an image sensor to a target location, and a tangent line to the logarithmic spiral curve at the location of the image sensor. The trajectory module 802 stores the series of trajectories in the storage device. The trajectory module 802 allows the selection of a set of trajectories from the series of trajectories that fits the area of interest. The trajectory module 802 allows scaling the selected set of trajectories to cover the area of interest and transforming the scaled selected set of trajectories to coordinates to cover the area of the interest. A display module of the computing device 800 is coupled to the trajectory module 802. The display module may display the selected set of trajectories over an image of the area of interest.

As explained above, the trajectories may form the basis of a flight plan that may be determined by the computing device 800. The determined flight plan is downloaded from the computing device 800 to a drone flight control unit 810. The flight plan is then translated into flight instructions to a UAV such as a drone 820.

The drone 820 flies the determined flight plan to obtain images of a target 822. As explained above, the target 822 may be part of a larger segment of an area of interest. The drone 820 includes a controller 830. The controller 830 receives instructions from a transceiver 832 that is in communication with the flight controller 810. The controller 830 sends commands to flight controls 834 that control the altitude, speed, and direction of the drone 820 through engine speed and azimuth angle. The controller 830 also sends commands to a camera actuator 836 to position a camera 838 during flight. As explained above, the camera 838 is positioned to maintain a constant angle to the area of interest based on the flight path.

The process for determining a flight path for imaging an area of interest is as follows, understanding that the intent of the process is to use the system to create non-traditional UAV flight mission plans for mapping an area photographically. The computing device 800 executes the disclosed method to create non-traditional (non-linear, non-parallel, convergent) logarithmic spiral camera trajectories that may be used to execute flight patterns. It is to be understood, that a similar process may be followed for a ground based or water based vehicle that is deployed for imaging an area.

In this example, a reusable family (set) of unit-scale logarithmic spiral trajectories is created. One set is created for 0≤Theta≤π in increments of five (5) degrees, and a second set of trajectories is created for 0≤Theta≤π in increments of ten (10) degrees while the constant tangent angle Psi is varied (0≤=Psi≤=π/2) using increments of five (5) degrees. The trajectory construction process is as follows: For a given value of Psi, the value of Theta is varied throughout its entire range of values, thus creating a single trajectory; and the processes is repeated for an incremented value of Psi. An entire library of unit scale trajectory templates can be created in a single spreadsheet and saved as a single .csv file. The unit scale trajectory templates are reusable.

Once the trajectory templates are calculated, based on the size and shape of a specific target (point, area, or narrow corridor), a few trajectories needed to cover the target area are selected by taking the eccentricity of the templates into account. The selected unit-scale trajectory templates (waypoints) are scaled to reflect the (x, y) dimensions (extremities) of the target. In this example, the system will transform (rotate and translate) the two-dimensional (2D) scaled trajectories (waypoints) into three-dimensional (3D) real world State Plane (NAD83/NADV) Cartesian coordinates. Subsequently, the Cartesian state plane coordinate waypoints are converted into WGS84 (Latitude/Longitude, elevation) coordinate waypoints.

In this example, after the non-traditional logarithmic spiral waypoints have been converted into WGS84 (Latitude/Longitude, elevation) coordinates, the process is continued with the use of UAV mission planning software such as DJIFlightPlanner to create a traditional (linear, parallel flight lines) UAV mission plan. The software may be run on the computing device 800. The flight planning process involves first defining the target area boundary points, which become the basis for the automatic creation of a traditional (equally spaced, linear, parallel) set of flight lines. At each waypoint along the flight lines, the software operator prescribes one or more actions to be executed. The actions may include: a) ascend/descend, b) take a photograph, c) change direction, d) orbit a point, or e) return to base. In this example, a completed "DJI" CSV mission plan (waypoint) file is exported. A Google Earth kmz file of the target area is exported for visualization of results. A "Litchi" mission plan (waypoint) CSV file is exported.

In this example, an operator may use a spreadsheet program to open and edit the Litchi mission plan CSV file to replace all the DJI (traditional) waypoints with the logarithmic spiral (non-traditional) waypoints, without making any changes to the attributes (actions) associated with any particular waypoint record. After the edit operations are complete, the CSV file is re-saved with the updated/edited trajectories (modified mission plan CSV file) stored in the computing device 800.

Using the Litchi Mission Hub, the edited Litchi mission plan CSV file is opened and updated as necessary using Litchi protocols and procedures to archive a non-traditional UAV mission plan CSV file. The mission plan is then sent to the flight controller 810, which in this example is a Litchi flight controller. Once the plan is loaded, the drone 820 may be flown based on the non-traditional UAV mission plan trajectories.

The present disclosure relates generally to the field of digital image data capture (terrestrial and/or aerial photography) using various types of cameras deployed by various types of mechanisms along a logarithmic spiral trajectory for the purpose of developing a) three-dimensional point clouds and b) associated orthophotography and DEM (using Structure-from-Motion techniques) each depicting the three dimensional topographical scene that was photographed. The scene may or may not include man-made structures in either open (outdoor) or enclosed (indoor) environments.

Figure 9:
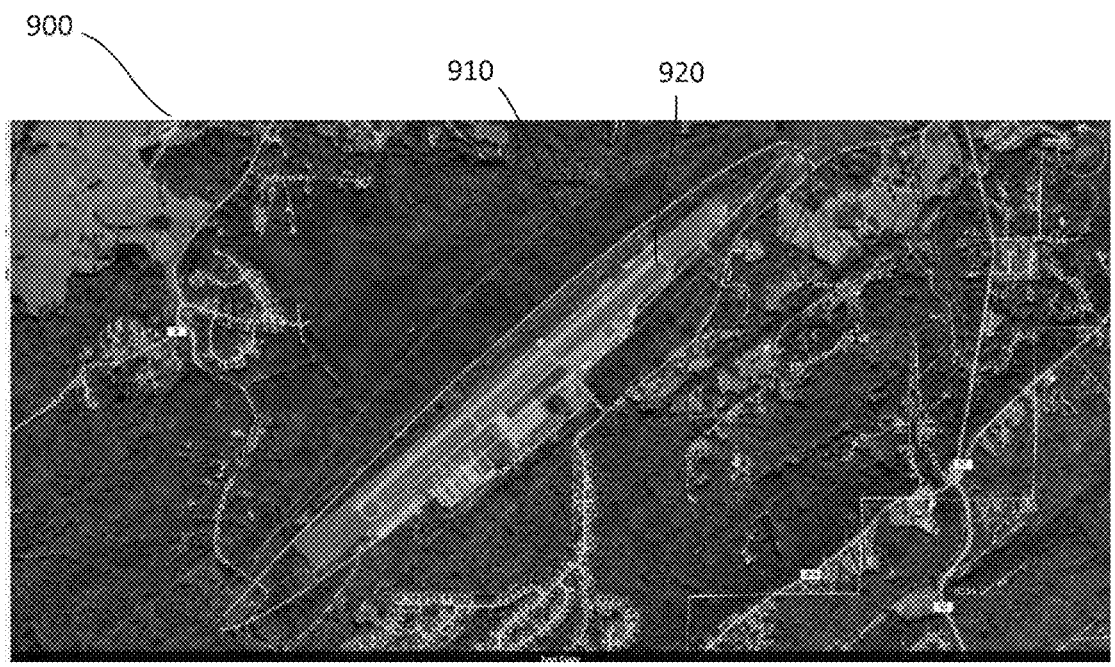
FIG. 9 is an example flight plan generated by the logarithmic spiral to provide imaging over a large area of interest, a typical municipal airport.

FIG. 9 illustrates non-traditional logarithmic spiral trajectories of a flight plan projected onto an area of interest. The trajectories are determined using the process described above. In this example, the image 900 illustrates flight trajectories 910 displayed (using Google Earth) over the target area, which is Bessemer Airport in Bessemer, Ala. The trajectories extend beyond the ends of a runway 920 and well beyond the edges of the developed airport property to ensure that the resulting SfM model covers the entire target area.

This example, demonstrates the development of the logarithmic spiral trajectories into an actual non-traditional manned (piloted) aircraft mission plan. The example area of interest is a commercial airport (Bessemer Airport). The site is 0.5 miles wide and 2.2 miles long or 1.1 square miles in area and may be characterized as a long wide corridor.

Since a manned fixed-wing aircraft is used in this example, wider more rounded logarithmic spiral trajectories are desirable to facilitate easier transition from one flight loop to another. Thus, trajectories with constant tangent angles (Psi) of 40, 50, and 60 degrees were chosen from the family/set of unit-scale trajectories. The unit-scale trajectories were re-scaled (X-Scale=11,147 and Y-Scale=7,500) to ensure the entire area of interest was covered to provide a geometrically correct result. The required transformation matrix is computed; and the trajectory waypoint coordinates are transformed into a local horizontal Cartesian coordinate system. The local horizontal Cartesian waypoints (Easting, Northing, elevation) are loaded into mapping software such as Global Mapper and projected into state plane coordinates (Alabama—West in this example) to provide geographically correct flight trajectories.

Shape (.shp) files were exported (for both points and lines) for subsequent use with the CartoMobile GIS mapping software running on the iPad/iPhone, providing a fundamental pilot navigation aid. A CSV (text) file may be exported (Alabama-West State Plane Coordinates) for use with a proprietary pilot navigation software package (PNAV). A Google Earth .kmz file of the area of interest was exported for visualization (quality assurance) purposes using Google Earth. The kmz file may be used to transfer the flight plan (trajectories/waypoints) to a commercially available flight planning software such as ForeFlight.

In this example, a manned aircraft was selected to fly the mission's logarithmic spiral trajectories guided by the PNAV pilot navigation software. The example aircraft is a twin-engine Partenavia aircraft used regularly for collecting traditional aerial photography (both orthophotography and oblique photos). The Partenavia aircraft is well suited for this type of mission since it is a very stable aerial photography platform capable of fairly slow flight speeds in the range of 60 to 70 knots (air speed), and it has a large camera bay. The Partenavia aircraft is equipped with a moving map pilot navigation system (PNAV).

Figure 10A:
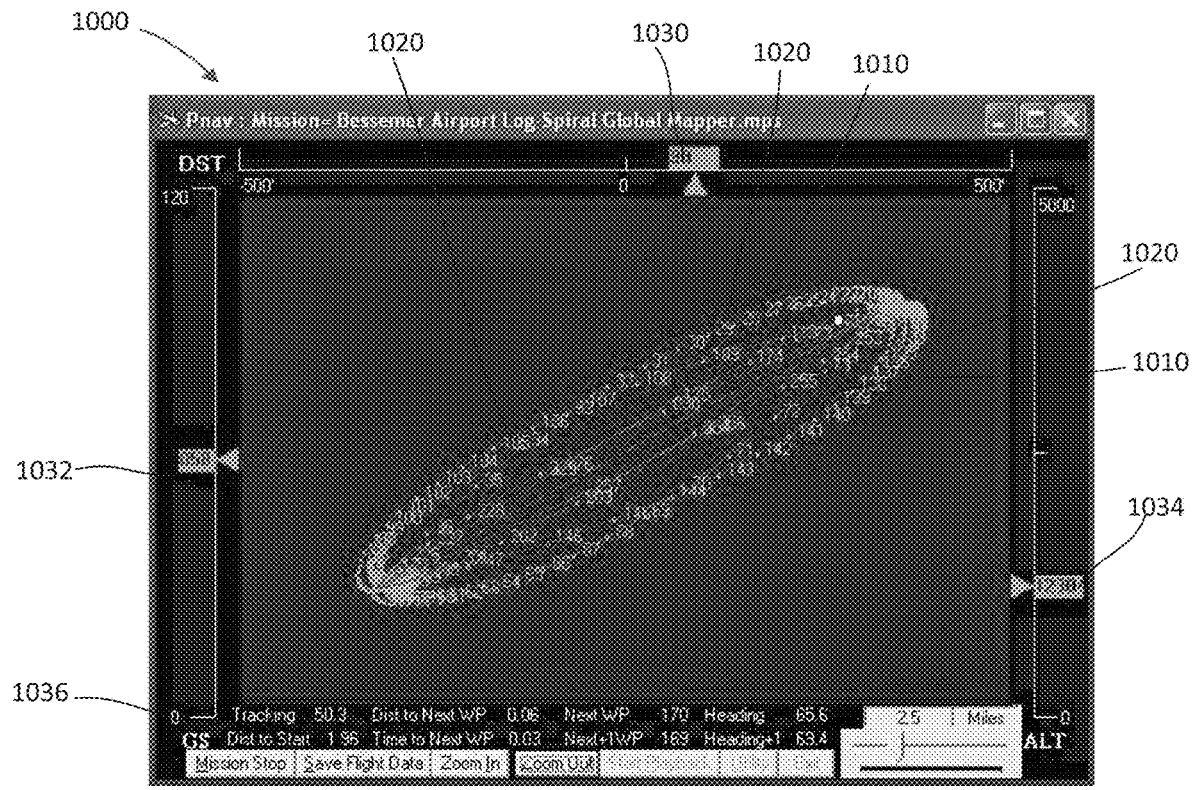
FIG. 10A is an image of a pilot navigation system (PNAV) display showing an example overview mission plan generated with the disclosed methods for the flight plan in FIG. 9.

FIG. 10A shows an overview image of an example PNAV display 1000 on an aircraft to assist a pilot in flying a mission plan to take images of an area. The display 1000 illustrates an overview of the mission plan. The individual flight trajectories are shown as lines 1010 while each waypoint along the individual flight trajectories is shown as a point (dot) 1020 along with a corresponding waypoint identification number.

The display 1000 includes a distance marker 1030, a ground speed marker 1032, and an altitude marker 1034. The distance marker 1030 at the top of the display 1000 indicates the aircraft's distance (left/right) of the current flight line. The ground speed marker 1032 on the left side of the display 1000 indicates the current ground speed in knots. The altitude marker 1034 at the right side of the display 1000 indicates the current height-above-ground in feet. The display 1000 includes a data items array 1036 at the bottom that provides the pilot with important navigation and flight data and offers controls for the PNAV display 1000 and data recording capabilities.

Figure 10B:
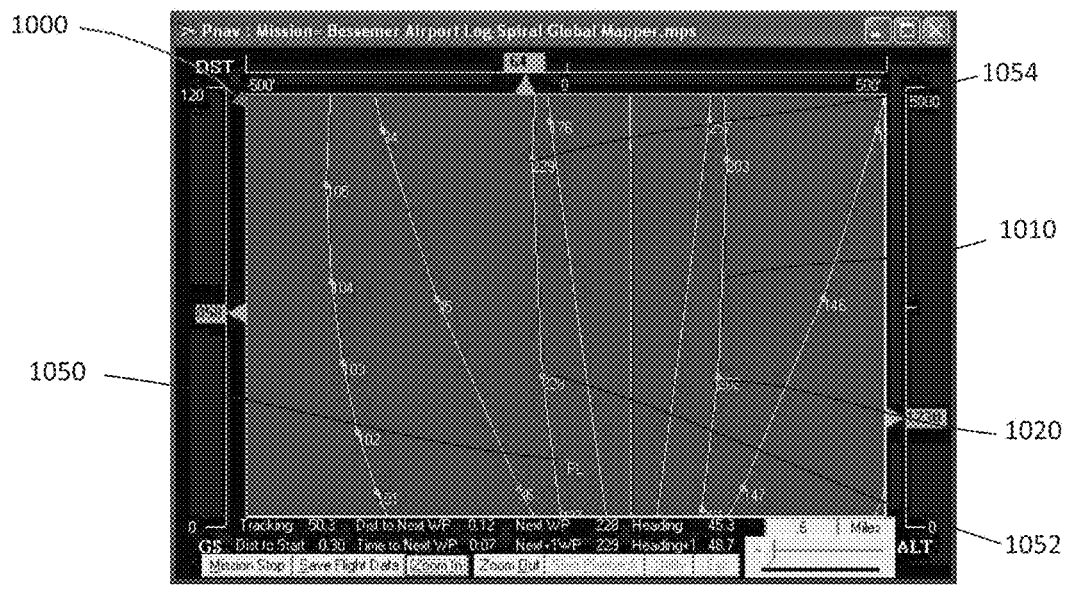
FIG. 10B is an image of the PNAV display in FIG. 10A after entering a flight pattern occupying one of the selected trajectories.

FIG. 10B shows the PNAV display 1000 in FIG. 10A shortly after entering the flight pattern determined from the selected trajectories. The location of the aircraft is represented by a symbol PL 1050. The data displayed at the bottom of the screen 1000 shows that the aircraft is 0.30 miles from (Dist to Start) the start point; is approaching waypoint number 228 (distance of 0.12 miles) shown as point 1052 at a heading of 45.3 degrees and an arrival time of 0.07 minutes; while the anticipated (Next+1) waypoint is numbered 229 shown as point 1054 at a heading of 48.7 degrees. The aircraft heading is constantly changing as the aircraft proceeds from one waypoint to the next.

Figure 10C:
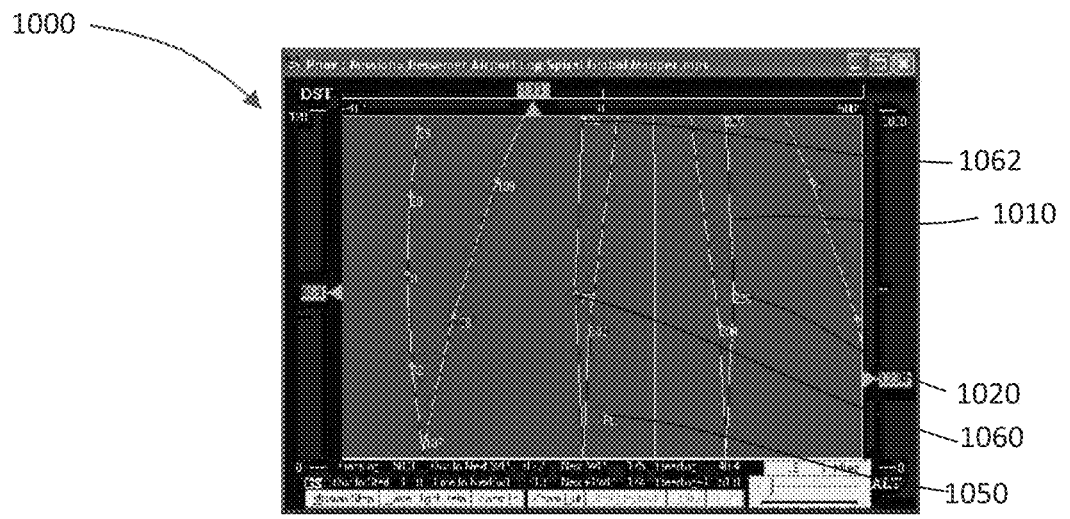
FIG. 10C is an image of the PNAV display in FIG. 10A with an example aircraft having flown in approximately to the midpoint of the first flight trajectory in FIG. 9.

FIG. 10C shows the PNAV display 1000 in FIG. 10A with the aircraft approximately half way through its first trajectory. The data displayed at the bottom of the screen 1000 shows the aircraft is 1.08 miles from (Dist to Start) the start point; is approaching waypoint number 175 (distance of 0.22 miles) shown as point 1060 at a heading of 48.4 degrees and an arrival time of 0.13 minutes; while the anticipated (Next+1) waypoint shown as point 1062 is numbered 174 at a heading of 51.8 degrees. The aircraft heading is constantly changing as it proceeds from one waypoint to the next.

Figure 10D:
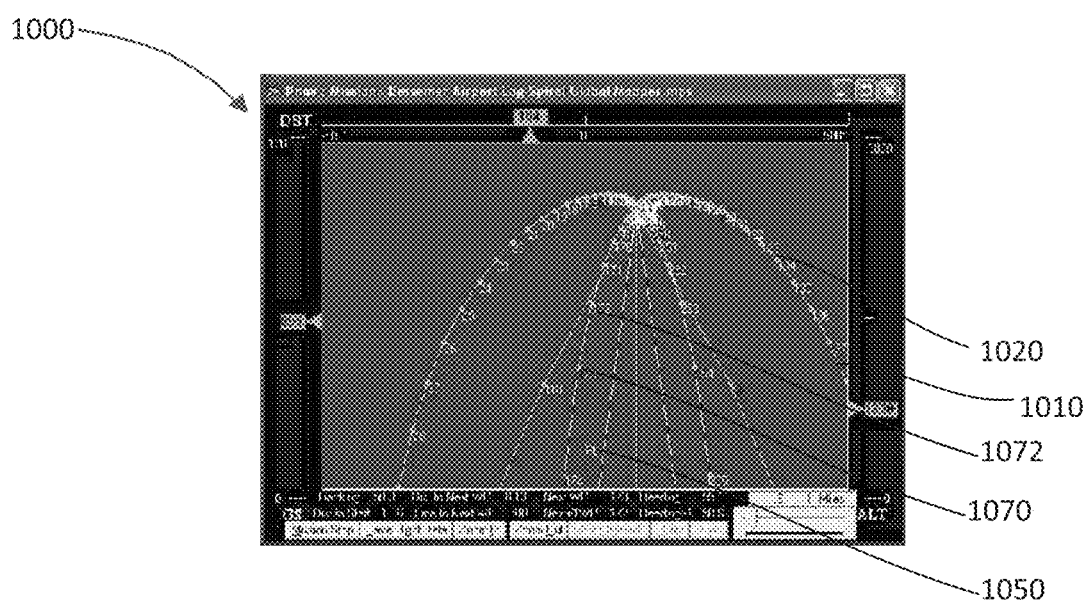
FIG. 10D is an image of the PNAV display in FIG. 10A with an example aircraft approaching the end of the first flight trajectory in FIG. 9.

FIG. 10D shows the PNAV display 1000 in FIG. 10A with the aircraft approaching the end of its first trajectory with all flight trajectories converging on each other. The data displayed at the bottom of the screen 1000 shows that the aircraft is 1.66 miles from (Dist to Start) the start point; is approaching waypoint number 173 (distance of 0.13 miles) shown as a point 1070 at a heading of 55.1 degrees and an arrival time of 0.08 minutes; while the anticipated (Next+1) waypoint is numbered 172 at a heading of 58.6 degrees shown as a point 1072. The aircraft heading is constantly changing as it proceeds from one waypoint to the next.

As the end (convergent) point of the trajectories is approached, the pilot will either choose to follow the waypoints through and along the same trajectory loop or break away, make a smooth transition turn, and pick up his next trajectory to return to the "start" end of the target area. It is recommended that the pilot plan (and perhaps rehearse) his anticipated maneuvers ahead of the time of the flight. The PNAV pilot navigation system does have a "simulation" mode to support such pilot planning efforts and/or rehearsals.

Figure 11:
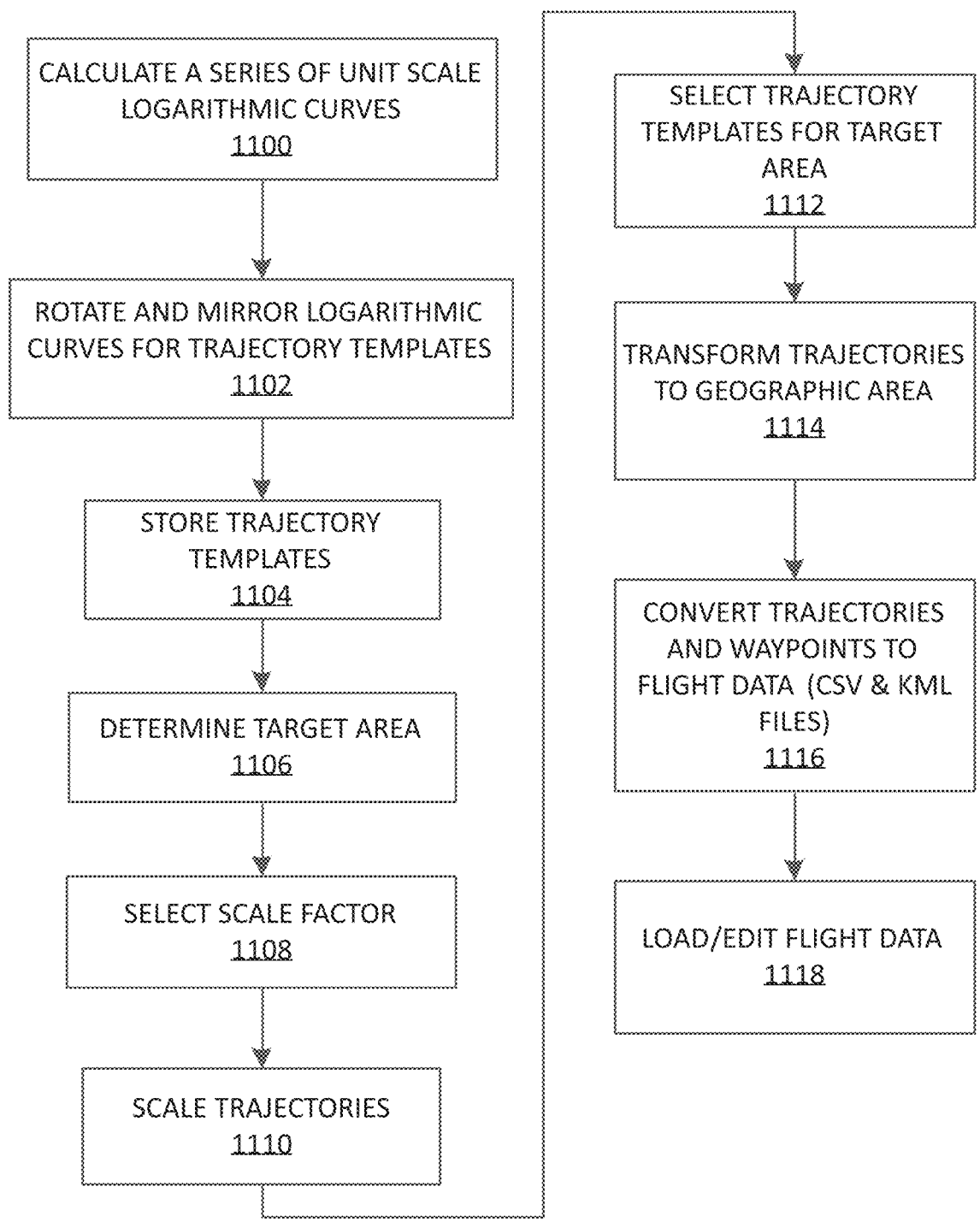
FIG. 11 is a flow diagram of the process of generating flight paths from the previously constructed logarithmic spiral trajectory templates.

FIG. 11 is a flow diagram of the software instructions executed by the trajectory module of the system 800 in FIG. 8 to produce a flight plan. The flow diagram in FIG. 11 is representative of example machine readable instructions for the computing device 800 in FIG. 8. In this example, the machine readable instructions comprise an algorithm for execution by: (a) a processor; (b) a controller; and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowchart of FIG. 11 may be implemented manually. Further, although the example algorithm is described with reference to the flowchart illustrated in FIG. 11, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The computing device 800 first calculates a series of logarithmic curves (1100). A series of constant tangent angles (Psi) are selected, for example 18 angles at five degree intervals from zero to 90 degrees. For each of the constant tangent angles, a range of basis angles (Theta) are selected, for example 37 angles at five degree intervals from zero to 180 degrees. Thus, a series of logarithmic curves, each having a constant tangent angle and a constant predetermined angle, which result in 72 curves in this example.

The computing device 800 then rotates and mirrors the logarithmic curves to produce corresponding trajectory templates (1102). The resulting trajectory templates are stored as a library of trajectory templates (1104). The operator of the computing device 800 then determines the target area by viewing an image file (e.g., Google Earth) or a map file (e.g., CartoMobile) or coordinate file from a GIS system (1106). An appropriate scale factor is selected to fit the trajectories to the target area (1108). The trajectories in the library are then scaled based on the selected scaled factor (1110).

Appropriate trajectory templates are then selected from the library of trajectory templates to cover the target area (1112). Each of the selected trajectory waypoints are then converted to coordinates relating to the target area (1116). The coordinates of the trajectories and the waypoints are converted to flight data in the form of data files such as .csv and .kml files. The flight data is loaded into an appropriate flight controller in the case of an unmanned aircraft or an autopilot system in the case of a manned aircraft (1118).

Figure 12:
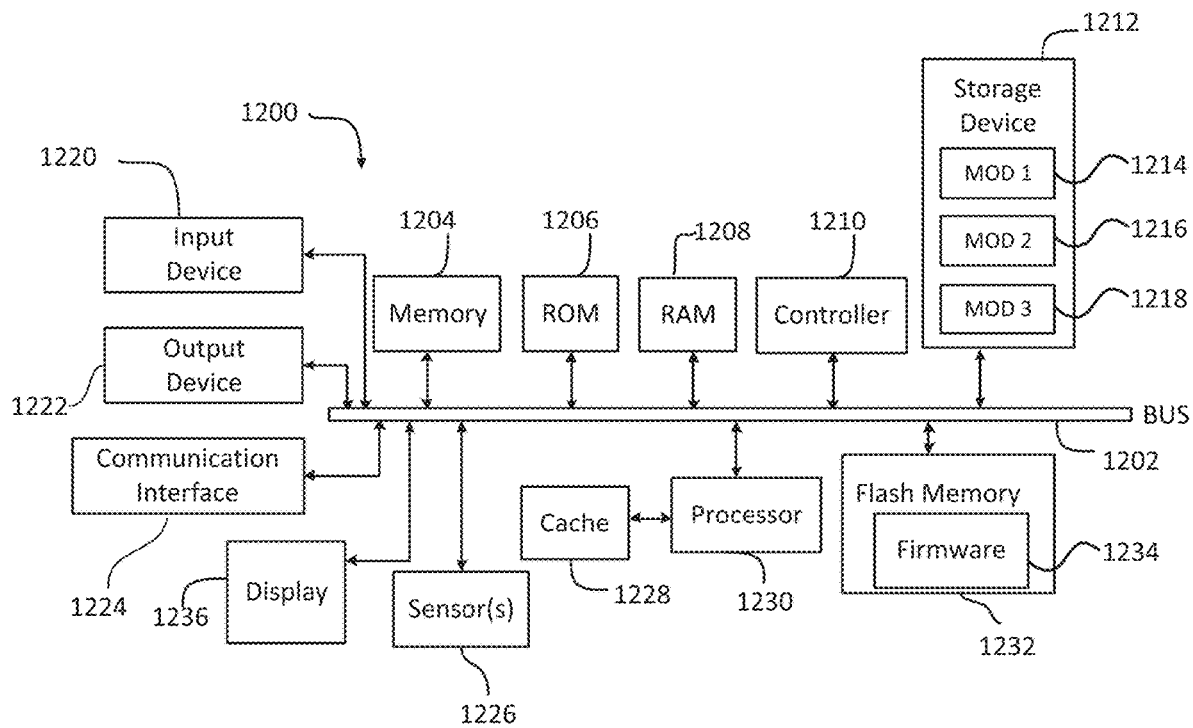
FIGS. 12-13 are block diagrams of example computing devices that may be used for construction of trajectory templates and the conversion of such templates into flight plans.

FIG. 12 illustrates an example computing system 1200, in which the components of the computing system are in electrical communication with each other using a bus 1202. The system 1200 includes a processing unit (CPU or processor) 1230, and a system bus 1202 that couples various system components, including the system memory 1204 (e.g., read only memory [ROM] 1206 and random access memory [RAM] 608), to the processor 1230. The system 1200 can include a cache of high-speed memory connected directly with, in close proximity to, or integrated as part of the processor 1230. The system 1200 can copy data from the memory 1204 and/or the storage device 1212 to the cache 1228 for quick access by the processor 1230. In this way, the cache can provide a performance boost for processor 1230 while waiting for data. These and other modules can control or be configured to control the processor 1230 to perform various actions. Other system memory 1204 may be available for use as well. The memory 1204 can include multiple different types of memory with different performance characteristics. The processor 1230 can include any general purpose processor and a hardware module or software module, such as module 1 1214, module 2 1216, and module 3 1218 embedded in storage device 1212. The hardware module or software module is configured to control the processor 1230, as well as a special-purpose processor where software instructions are incorporated into the actual processor design. The processor 1230 may essentially be a completely self-contained computing system, containing multiple cores or processors, a bus, memory controller, cache, etc. A multi-core processor may be symmetric or asymmetric.

To enable user interaction with the computing device 1200, an input device 1220 is provided as an input mechanism. The input device 1220 can comprise a microphone for speech, a touch-sensitive screen for gesture or graphical input, keyboard, mouse, motion input, and so forth. In some instances, multimodal systems can enable a user to provide multiple types of input to communicate with the system 1200. In this example, an output device 1222 is also provided. The communications interface 1224 can govern and manage the user input and system output.

Storage device 1212 can be a non-volatile memory to store data that are accessible by a computer. The storage device 1212 can be magnetic cassettes, flash memory cards, solid state memory devices, digital versatile disks, cartridges, random access memories (RAMs) 1208, read only memory (ROM) 1206, and hybrids thereof.

The controller 1210 can be a specialized microcontroller or processor on the system 1200, such as a BMC (baseboard management controller). In some cases, the controller 1210 can be part of an Intelligent Platform Management Interface (IPMI). Moreover, in some cases, the controller 1210 can be embedded on a motherboard or main circuit board of the system 1200. The controller 1210 can manage the interface between system management software and platform hardware. The controller 1210 can also communicate with various system devices and components (internal and/or external), such as controllers or peripheral components, as further described below.

The controller 1210 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 1210 can also include a system event log controller and/or storage for managing and maintaining events, alerts, and notifications received by the controller 610. For example, the controller 1210 or a system event log controller can receive alerts or notifications from one or more devices and components, and maintain the alerts or notifications in a system event log storage component.

Flash memory 1232 can be an electronic non-volatile computer storage medium or chip that can be used by the system 1200 for storage and/or data transfer. The flash memory 1232 can be electrically erased and/or reprogrammed. Flash memory 1232 can include EPROM (erasable programmable read-only memory), EEPROM (electrically erasable programmable read-only memory), ROM, NVRAM, or CMOS (complementary metal-oxide semiconductor), for example. The flash memory 1232 can store the firmware 1234 executed by the system 1200 when the system 1200 is first powered on, along with a set of configurations specified for the firmware 1234. The flash memory 1232 can also store configurations used by the firmware 1234.

The firmware 1234 can include a Basic Input/Output System or equivalents, such as an EFI (Extensible Firmware Interface) or UEFI (Unified Extensible Firmware Interface). The firmware 1234 can be loaded and executed as a sequence program each time the system 1200 is started. The firmware 1234 can recognize, initialize, and test hardware present in the system 1200 based on the set of configurations. The firmware 1234 can perform a self-test, such as a POST (Power-on-Self-Test), on the system 1200. This self-test can test the functionality of various hardware components such as hard disk drives, optical reading devices, cooling devices, memory modules, expansion cards, and the like. The firmware 1234 can address and allocate an area in the memory 1204, ROM 1206, RAM 1208, and/or storage device 1212, to store an operating system (OS). The firmware 1234 can load a boot loader and/or OS, and give control of the system 1200 to the OS.

The firmware 1234 of the system 1200 can include a firmware configuration that defines how the firmware 1234 controls various hardware components in the system 1200. The firmware configuration can determine the order in which the various hardware components in the system 1200 are started. The firmware 1234 can provide an interface, such as an UEFI, that allows a variety of different parameters to be set, which can be different from parameters in a firmware default configuration. For example, a user (e.g., an administrator) can use the firmware 1234 to specify clock and bus speeds; define what peripherals are attached to the system 1200; set monitoring of health (e.g., fan speeds and CPU temperature limits); and/or provide a variety of other parameters that affect overall performance and power usage of the system 1200. While firmware 1234 is illustrated as being stored in the flash memory 1232, one of ordinary skill in the art will readily recognize that the firmware 1234 can be stored in other memory components, such as memory 1204 or ROM 1206.

System 1200 can include one or more sensors 1226. The one or more sensors 1226 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1226 can communicate with the processor, cache 1228, flash memory 1232, communications interface 1224, memory 1204, ROM 1206, RAM 1208, controller 1210, and storage device 1212, via the bus 1202, for example. The one or more sensors 1226 can also communicate with other components in the system via one or more different means, such as inter-integrated circuit (I2C), general purpose output (GPO), and the like. Different types of sensors (e.g., sensors 1226) on the system 1200 can also report to the controller 1210 on parameters, such as cooling fan speeds, power status, operating system (OS) status, hardware status, and so forth. A display 1236 may be used by the 1200 to provide graphics related to the applications that are executed by the controller 1210, or the processor 1230.

Figure 13:
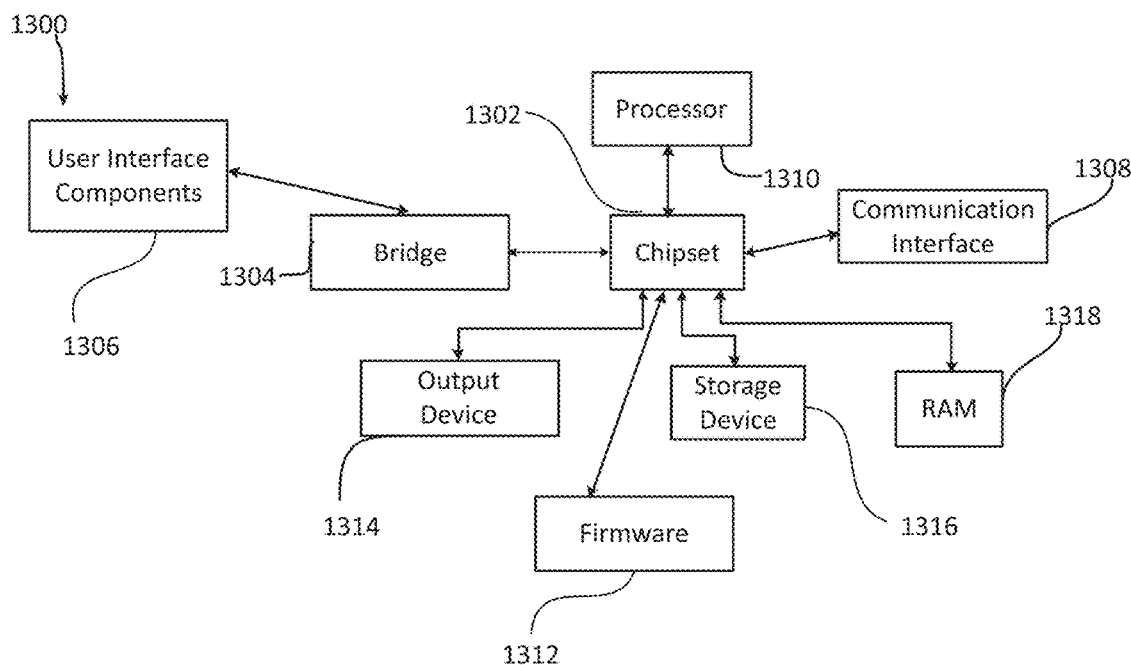

FIG. 13 illustrates an example computer system 1300 having a chipset architecture that can be used in executing the described method(s) or operations, and generating and displaying a graphical user interface (GUI). Computer system 1300 can include computer hardware, software, and firmware that can be used to implement the disclosed technology. System 1300 can include a processor 1310, representative of a variety of physically and/or logically distinct resources capable of executing software, firmware, and hardware configured to perform identified computations. Processor 1310 can communicate with a chipset 1302 that can control input to and output from processor 1310. In this example, chipset 1302 outputs information to output device 1314, such as a display, and can read and write information to storage device 1316. The storage device 1316 can include magnetic media, and solid state media, for example. Chipset 1302 can also read data from and write data to RAM 1318. A bridge 1304 for interfacing with a variety of user interface components 1306, can be provided for interfacing with chipset 1302. User interface components 1306 can include a keyboard, a microphone, touch detection and processing circuitry, and a pointing device, such as a mouse.

Chipset 1302 can also interface with one or more communication interfaces 1308 that can have different physical interfaces. Such communication interfaces can include interfaces for wired and wireless local area networks, for broadband wireless networks, and for personal area networks. Further, the machine can receive inputs from a user via user interface components 1306, and execute appropriate functions, such as browsing functions by interpreting these inputs using processor 1310.

Moreover, chipset 1302 can also communicate with firmware 1312, which can be executed by the computer system 1300 when powering on. The firmware 1312 can recognize, initialize, and test hardware present in the computer system 1300 based on a set of firmware configurations. The firmware 1312 can perform a self-test, such as a POST, on the system 1300. The self-test can test the functionality of the various hardware components 1302-1318. The firmware 1312 can address and allocate an area in the RAM memory 1318 to store an OS. The firmware 1312 can load a boot loader and/or OS, and give control of the system 1300 to the OS. In some cases, the firmware 1312 can communicate with the hardware components 1302-1310 and 1314-1318. Here, the firmware 1312 can communicate with the hardware components 1302-1310 and 1314-1318 through the chipset 1302, and/or through one or more other components. In some cases, the firmware 1312 can communicate directly with the hardware components 1302-1310 and 1314-1318.

It can be appreciated that example systems 1200 and 1300 can have more than one processor (e.g., 1230, 1310), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method of developing a path for taking images from a geographic area, corridor, or point of interest, the method comprising:
   determining a series of trajectories, each trajectory determined based on a logarithmic spiral curve derived from a basis angle from a predetermined range of basis angles and selecting a constant tangent angle between a radial line from the location of an image sensor to a target location, and a tangent line to the slope of the logarithmic spiral curve at the location of the image sensor on the logarithmic spiral curve;
   selecting a set of trajectories from the series of trajectories and scaling the trajectories to cover the area of interest;
   transforming the selected trajectories to coordinates corresponding to the geographic area of interest; and
   storing the set of scaled trajectories as the path for taking images.

2. The method of claim 1, further comprising creating a trajectories library by storing the selected series of determined trajectories as a library of trajectory templates.

3. The method of claim 2, wherein the series of trajectories are created based on incremented values between each constant tangent angle.

4. The method of claim 2, wherein the predetermined range of basis angles are incremented by a selected angle in the range.

5. The method of claim 1, further comprising creating a flight plan for an aircraft based on a set of scaled trajectories.

6. The method of claim 5, wherein the flight plan includes a set of sequenced waypoints determined by translating and rotating trajectory waypoints based on the geographic area, corridor, or point of interest.

7. The method of claim 6, wherein the waypoints are input in a flight controller.

8. The method of claim 5, wherein the aircraft is an unmanned aircraft.

9. The method of claim 5, wherein the aircraft is piloted, and wherein the waypoints are displayed on a PNAV navigation display in an aircraft cockpit.

10. The method of claim 1, wherein the area of interest is one of a point, a long and narrow shape, a rectangular shape, a square shape, triangular shape, or a circular shape.

11. The method of claim 1, wherein the coordinates are one of a Cartesian set of coordinates, a polar set of coordinates, a set of GIS coordinates, or a set of GPS coordinates.

12. The method of claim 1, wherein the logarithmic curve is determined by the equation:

$$r = +e^{((\text{Theta}-\pi)*\cot(Psi))}$$

wherein r is the distance from the origin to the logarithmic curve, Theta is the predetermined basis angle, and Psi is the constant tangent angle.

13. The method of claim 1, wherein the logarithmic curve is determined by one of a Fibonacci series, mathematical series, a series of Bezier curves, or a series of B-splines.

14. The method of claim 1, wherein the image sensor is a camera.

15. A system to determine a path for taking images of geographic area, corridor, or point of interest, the system comprising:
a storage device storing coordinates of the area of interest;
a trajectory module coupled to the storage device, the trajectory module operative to:
determine a series of trajectories, each trajectory determined based on a logarithmic spiral curve derived from a basis angle from a predetermined range of basis angles and selecting a constant tangent angle between a radial line from the location of an image sensor to a target location, and a tangent line to the slope of the logarithmic spiral curve at the location of the image sensor on the logarithmic spiral curve;
store the series of trajectories in the storage device,
select a set of trajectories from the series of trajectories,
scale the selected set of trajectories to cover the area of interest,
transform the scaled selected set of trajectories to coordinates to cover the area of the interest; and
a display module coupled to the trajectory module, the display module displaying the selected set of trajectories over an image of the area of interest.

16. The system of claim 15, wherein the storage device includes the series of determined trajectories stored as a library of trajectory templates.

17. The system of claim 16, wherein the series of trajectories are created based on incremented values between each constant tangent angle.

18. The system of claim 16, wherein the predetermined range of basis angles are incremented by a selected angle in the range.

19. The system of claim 15, further comprising a flight plan module operable for creating a flight plan for an aircraft based on a set of scaled trajectories.

20. The system of claim 19, wherein the flight plan includes a set of sequenced waypoints determined by translating and rotating trajectory waypoints based on the geographic area, corridor, or point of interest.

21. The system of claim 19, wherein the waypoints are in a format for input in a flight controller.

22. The system of claim 19, wherein the aircraft is an unmanned aircraft.

23. The system of claim 19, wherein the aircraft is piloted, and wherein the waypoints are displayed on a PNAV navigation display in an aircraft cockpit.

24. The system of claim 15, wherein the area of interest is one of a point, a long and narrow shape, a rectangular shape, a square shape, a triangular shape, or a circular shape.

25. The method of claim 15, wherein the coordinates are one of a Cartesian set of coordinates, a polar set of coordinates, a set of GIS coordinates, or a set of GPS coordinates.

26. The system of claim 15, wherein the logarithmic curve is determined by the equation:

$$r = +e^{((\text{Theta}-\pi)*\cot(Psi))}$$

wherein r is the distance from the origin to the logarithmic curve, Theta is the predetermined basis angle, and Psi is the constant tangent angle.

27. The system of claim 15, wherein the logarithmic curve is determined by one of a Fibonacci series, mathematical series, a series of Bezier curves, or a series of B-splines.

28. The system of claim 15, wherein the image sensor is a camera.

29. A system for imaging aft a geographic area, corridor, or point of interest, the system comprising:
an image sensor operable to capture images;
a flight controller having a flight plan, the flight plan generated by:
determining a series of trajectories, each trajectory determined based on a logarithmic spiral curve derived from a basis angle from a predetermined range of basis angles and selecting a constant tangent angle between a radial line from the location of an image sensor to a target location, and a tangent line to the slope of the logarithmic spiral curve at the location of the image sensor on the logarithmic spiral curve;
selecting a set of trajectories from the series of trajectories;
scaling the selected set of trajectories to cover the area of interest;
transforming the selected set of trajectories to coordinates corresponding to the area of interest; and
generating a set of waypoints for the flight plan; and
an aircraft having the image sensor, the aircraft controlled by the flight controller in accordance to the flight plan to fly over the area of interest.

* * * * *

UNITED STATES PATENT AND TRADEMARK OFFICE
CERTIFICATE OF CORRECTION

PATENT NO. : 10,741,086 B2
APPLICATION NO. : 16/053558
DATED : August 11, 2020
INVENTOR(S) : James W. Dow et al.

It is certified that error appears in the above-identified patent and that said Letters Patent is hereby corrected as shown below:

In the Claims

Column 24, Line 59, Claim 2, Line 3, delete "a library of".

Column 26, Line 35, Claim 29, Line 1, delete "aft".

Signed and Sealed this
Thirteenth Day of October, 2020

Andrei Iancu
*Director of the United States Patent and Trademark Office*